(12) United States Patent
Fujita et al.

(10) Patent No.: US 8,956,729 B2
(45) Date of Patent: Feb. 17, 2015

(54) SURFACE-TREATED METAL MATERIAL AND PROCESS FOR PRODUCING THE SAME

(75) Inventors: Soshi Fujita, Tokyo (JP); Atsushi Morishita, Tokyo (JP); Taihei Kaneto, Tokyo (JP); Masahiro Fuda, Tokyo (JP)

(73) Assignee: Nippon Steel & Sumitomo Metal Corporation, Tokyo (JP)

(*) Notice: Subject to any disclaimer, the term of this patent is extended or adjusted under 35 U.S.C. 154(b) by 170 days.

(21) Appl. No.: 13/320,478

(22) PCT Filed: May 10, 2010

(86) PCT No.: PCT/JP2010/058239
§ 371 (c)(1),
(2), (4) Date: Nov. 14, 2011

(87) PCT Pub. No.: WO2010/131756
PCT Pub. Date: Nov. 18, 2010

(65) Prior Publication Data
US 2012/0064354 A1 Mar. 15, 2012

(30) Foreign Application Priority Data
May 11, 2009 (JP) ................. 2009-114915

(51) Int. Cl.
*B32B 27/26* (2006.01)
*B32B 27/32* (2006.01)
*B32B 27/40* (2006.01)

(52) U.S. Cl.
USPC ........ 428/425.8; 428/447; 428/450; 428/457; 428/461; 427/388.4; 427/387; 427/386

(58) Field of Classification Search
USPC ............... 428/425.8, 447, 450, 457, 461; 427/386, 387, 388.4
See application file for complete search history.

(56) References Cited

U.S. PATENT DOCUMENTS

| 5,393,605 | A | * | 2/1995 | Miyoshi et al. | 428/327 |
| 6,638,633 | B1 | * | 10/2003 | Komori et al. | 428/457 |
| 6,770,373 | B1 | | 8/2004 | Kinoshita et al. | |
| 2002/0098367 | A1 | | 7/2002 | Mori et al. | |
| 2004/0033909 | A1 | * | 2/2004 | Yamaoka et al. | 508/138 |
| 2010/0233490 | A1 | | 9/2010 | Morishita et al. | |

FOREIGN PATENT DOCUMENTS

| EP | 0575621 A1 | 12/1993 |
| EP | 1186351 A1 | 3/2002 |
| GB | 1124690 | 8/1968 |
| JP | 7-11089 A | 1/1995 |
| JP | 08053646 A * | 2/1996 |
| JP | 8-267002 A | 10/1996 |
| JP | 2000-239690 A | 9/2000 |
| JP | 2001-164182 A | 6/2001 |
| JP | 2003-27256 A | 1/2003 |
| JP | 2003-73856 A | 3/2003 |
| JP | 2004-18887 A | 1/2004 |
| JP | 2004-338397 A | 12/2004 |
| JP | 2005-206764 A | 8/2005 |
| JP | 2006-22363 A | 1/2006 |
| JP | 2007-75777 A | 3/2007 |
| JP | 2008-25023 A | 2/2008 |
| WO | WO 2005/071052 A1 | 8/2005 |

OTHER PUBLICATIONS

McCrum, "An Internal Friction Study of Polytetrafluoroethylene," Journal of Polymer Science, vol. XXXIV, 1959, Nottingham Symposium, pp. 355-369.
International Search Report, dated Aug. 24, 2010 in PCT/JP2010/058239.

* cited by examiner

*Primary Examiner* — Thao T. Tran
(74) *Attorney, Agent, or Firm* — Birch, Stewart, Kolasch & Birch, LLP

(57) ABSTRACT

A surface-treated metal material, comprising: a metal material, and a coating film disposed on the surface thereof, the coating film containing (A) an organic resin having a glass transition temperature of more than 35° C. and not more than 100° C., and (B) an organic resin having a glass transition temperature of more than 100° C. and not more than 250° C.; wherein the difference between the glass transition temperatures of the organic resins (A) and (B) is 50° C. or more. There are provided a surface-treated metal material having a coating film which contains no environmental load substance such as hexavalent chromium, and is particularly excellent in scratch resistance, press formability, and corrosion resistance after the shape processing thereof, and also a process for producing such a surface-treated metal material.

18 Claims, No Drawings

SURFACE-TREATED METAL MATERIAL AND PROCESS FOR PRODUCING THE SAME

TECHNICAL FIELD

The present invention relates to a surface-treated metal material, which is most preferably be used for the application thereof to household electric appliances, automobiles and building materials, more specifically, to a surface-treated metal material having a coating film, which does not contain an environmental load substance such as hexavalent chromium, and is particularly excellent in scratch resistance, press formability, and corrosion resistance after the shape processing thereof; and also to a process for producing such a surface-treated metal material.

BACKGROUND ART

In each of the fields of materials to be used for household electric appliances, automobiles and architectures, there has widely been used a surface-treated metal material, which has been obtained by subjecting the surface of a metal material, such as zinc-based plated steel sheet and aluminum-based plated steel sheet, to a chemical conversion coating, such as phosphate (or phosphoric acid salt) treatment, chromate treatment and chromate-free treatment, for the purpose of imparting corrosion resistance thereof, or adherence thereof with a top coating film. Particularly, in recent years, with a worldwide rise in the environmental consciousness, the ratio of the application of a chromate-free coating film, which does not use an environmental load substance, such as hexavalent chromium, is increasing.

In a case where a surface-treated metal material is used as a material for household electric appliances, automobiles and the like, a finished product is obtained by subjecting the surface-treated metal material to through various processing steps or transport steps. For example, a handling scratch in the processing step or an abrasion scratch in the transport step gives rise to a quality problem in many cases, and therefore, a surface-treated metal material having excellent scratch resistance is strongly demanded. Out of the processing steps, a most important step is a press forming (or press molding) step. At the time of the press forming, a press mold and a chemical conversion coating film come into contact with each other under a high surface pressure, to thereby cause the rubbing therebetween. Accordingly, if the chemical conversion coating film lacks strength, there may be caused damaging or separation of the coating film, to thereby incur the deterioration in the appearance quality thereof, such as blackening, or the reduction in the corrosion resistance thereof. On the other hand, the press forming also involves the deformation of the material in itself, such as elongation or compression thereof. Accordingly, if the chemical conversion coating film lacks flexibility (or elongation), the coating film cannot follow the deformation of the material, and the cracking or separation thereof may be produced in the coating film to thereby incur the deterioration in the quality of appearance, such as whitening, or the reduction in the corrosion resistance. That is, in order to guarantee a good press formability or corrosion resistance after the shape processing, it is important to apply a chemical conversion coating film excellent in both the strength and the flexibility (or elongation). Particularly, in recent years, a surface-treated metal material having excellent press formability and corrosion resistance after the shape processing thereof, which is less likely to be deteriorated in the appearance or corrosion resistance, even when it is subjected to a severe press forming process, for example, a heavy ironing-(ultra) deep drawing process for the application such as motor cover and cartridge-type tank, or a non-oiling process for the purpose of omitting an oiling step or a degreasing step.

Various types of chromate-free coating films have been heretofore devised. In comparison with a coating film comprising an inorganic compound as a main component, the coating film mainly comprising an organic resin is characterized in that it has an excellent effect of blocking a corrosion factor, as well as excellent lubricity (i.e., an effect of reducing the frictional force against a press mold), or has an excellent flexibility, and accordingly, it is advantageous in view of corrosion resistance and press formability. In particular, when a coating film can be formed by using an aqueous coating material mainly comprising an aqueous organic resin, the harm thereof to the environment and fire risk can be minimized as compared with those in the case of an organic solvent-type coating material, and such a coating film can meet the growing requirement for environmental consciousness. In addition, the coating equipment to be used therefor can be relatively simple and the above coating film can be produced by using equipment involving relatively low-temperature baking, and this not only enables minimizing the equipment investment cost, but also is advantageous in view of the energy cost involved in the production. Herein, the aqueous organic resin refers to a water-soluble organic resin or a water-dispersible organic resin, which is originally insoluble in water but, as in an emulsion or suspension, can be put into a state of being finely dispersed in water. The aqueous coating material refers to a coating material using a solvent mainly comprising water, and does not fall within the scope of the organic solvent, which is defined in the Industrial Safety and Health Law in Japan.

In the coating film mainly comprising an organic resin, one of the values of physical property affecting the characteristic of a coating is the glass transition temperature of the organic resin. The glass transition temperature is the temperature at which the organic resin changes from a vitreous state to a rubbery state, so as to cause a great change in the characteristic of the organic resin between those before and after the transition temperature, and this is a physical property value markedly affects the scratch resistance or press formability of the coating film. The glass transition temperature is also one of the indices generally indicating the strength or flexibility (or elongation) of an organic resin, and it is known that as the glass transition temperature of an organic resin becomes higher, the strength of the organic resin is increased but the flexibility (or elongation) thereof is reduced.

Heretofore, for the purpose of improving the performance of a coating film, several techniques to be used for a coating film mainly comprising a resin having a specific glass transition temperature have been disclosed. For the purpose of improving the corrosion resistance or the scratch resistance of the coating film at the time of the forming process, for example, Patent Document 1 discloses a technique to be used for a urethane-based resin coating film mainly comprising a polyurethane resin having a glass transition temperature of 100° C. or more; Patent Document 2 discloses a technique to be used for a coating film to be formed from a water-dispersible metal surface-treating agent mainly comprising an ethylene-unsaturated carboxylic acid copolymer having a glass transition temperature of 50 to 70° C.; Patent Document 3 discloses a technique for a coating film to be formed from a surface treating agent for a zinc-based plated steel sheet containing a urethane resin having a glass transition temperature of −40° C. to 0° C. and a water-soluble epoxy resin; and Patent Document 4 discloses a technique for a two-layer coating film comprising a lower coating layer formed from a solution of primer agent containing an aqueous organic resin, and an upper coating layer formed from an aqueous lubricating coating material containing an aqueous organic resin having a glass transition temperature of 70 to 200° C.

In the case of the coating films disclosed in Patent Documents 1 and 2, where the main component is one kind of an organic resin having a specific glass transition temperature, it is difficult to satisfy both of the strength and flexibility of the coating film, and in turn, the press formability and the corrosion resistance after the shape processing thereof are insufficient.

In both of the techniques to be used for a coating film disclosed in Patent Document 3, where two or more different kinds of resins are mixed, and the technique for a coating film disclosed in Patent Document 4, where two kinds of resins are formed into two layers of an upper coating layer and a lower coating layer, the glass transition temperature is to be designed only for one layer, which is insufficient for the design of the glass transition temperatures for the two layers, and therefore, for the same reason as stated above, the press formability and the corrosion resistance after the shape processing thereof are insufficient. Also, the urethane resin having a low glass transition temperature disclosed in Patent Document 3 is in a rubbery state at an ambient temperature, and this incurs a problem that handling scratches are readily made.

For the purpose of improving press formability by imparting good flexibility and strength to the coating film, Patent Document 5 discloses a technique for a coating film containing two or more different kinds of organic solvent-based thermosetting resins having a glass transition temperature of 50° C. or less, and a glass transition temperature exceeding 50° C., respectively.

However, the technique of Patent Document 5 uses an organic solvent-based thermosetting resin and therefore, it has a problem that the environmental load is high and moreover, a high thermal energy is unprofitably required at the baking and curing steps therefor. Further, a resin having a glass transition temperature of 50° C. or less is contained in the coating film, which causes a problem that, for example, the scratch resistance or press formability varies according to a change in the use environment such as summer season and winter season, and a resin having a high glass transition temperature is not contained in the coating film, which causes a problem that, for example, when press forming as severe as involving a steel sheet temperature exceeding 100° C. is performed, the press formability or the corrosion resistance after the shape processing thereof is reduced.

RELATED ART

Patent Document

[Patent Document 1] JP-A (Japanese Unexamined Patent Publication; KOKAI) No. 2007-75777
[Patent Document 2] JP-A No. 2003-73856
[Patent Document 3] JP-A No. 2001-271173
[Patent Document 4] JP-A No. 2004-338397
[Patent Document 5] JP-A No. 2004-18887

SUMMARY OF THE INVENTION

Problems to be Solved by the Invention

The present invention has been made by taking these problems into consideration, and an object of the present invention is to provide a surface-treated metal material having a coating which does not contain an environmental load substance such as hexavalent chromium, and is particularly excellent in the scratch resistance, the press formability and the corrosion resistance after the shape processing thereof, and to provide a process for producing such a surface-treated metal material.

Means to Solving the Problem

In order to obtain a coating film excellent in scratch resistance, the press formability and the corrosion resistance after the shape processing, it may be important to control the glass transition temperature of an organic resin as a main component of the coating film. ore specifically, it has been found that the above-mentioned performance may be markedly enhanced by devising a coating film containing two kinds of organic resins (A) and (B) which are different in the specific ranges of the glass transition temperature thereof. As described above, the glass transition temperature is a temperature at which the organic resin changes from a vitreous state to a rubbery state, and it is known that the characteristic of the organic resin is markedly changed between those before and after the glass transition temperature. Herein, the scratch resistance refers to a resistance against scratching to be made without involving deformation of the material, such as handling scratch in the processing step or abrasion scratch in the transport step. For the purpose of enhancing the scratch resistance, it may be important that the organic resins (A) and (B) as main components of the coating film are in a vitreous state at the ambient (or environmental) temperature at which these resins are to be used. That is, it may be important that the glass transition temperatures of the organic resins (A) and (B) are a temperature exceeding the ambient temperature for the use of the resins. If the glass transition temperatures of the organic resins (A) and (B) fall in the fluctuation range of the ambient temperature, the scratch resistance varies according to fluctuation of the ambient temperature and a stable quality may not be obtained. If the glass transition temperatures of the organic resins (A) and (B) are less than the ambient temperature for the use of the resins, the organic resins (A) and (B) may be in a rubbery state at the ambient temperature and adequate scratch resistance may not be obtained. The ambient temperature for the use of the resins in the general processing step or transport step is thought to be approximately from 0 to 35° and therefore, as an essential requirement, both of the organic resins (A) and (B) must have a glass transition temperature of more than 35° C. The ambient temperature may rise to near 50° C. on rare occasions and in such an environment, both of the organic resins (A) and (B) may preferably have a glass transition temperature of more than 50° C.

As described above, the glass transition temperature may also be one index indicating the strength or flexibility (or elongation) of an organic resin. The organic resin (A) having a low glass transition temperature may be excellent in the flexibility but may lack the strength. The organic resin (B) may be excellent in the strength but may lack the flexibility. For the purpose of securing the press formability and the corrosion resistance after the shape processing thereof, as described above, it may be important to design a coating film excellent in both of the strength and the flexibility. As a result of earnest and continuous studies, the present inventors have found that a coating film excellent in both of the strength and the flexibility, more specifically, a coating film particularly excellent in the press formability and the corrosion resistance after the shape processing thereof, may be obtained by incorporating both (A) an organic resin having a low glass transition temperature and (B) an organic resin having a high glass transition temperature into the coating film and at the same time, establishing a difference above a certain level between the glass transition temperatures of the organic resins (A) and (B).

It may be an essential requirement that the glass transition temperature of the (A) organic resin having a low glass transition temperature is 100° C. or less. By designing the glass transition temperature to be 100° C. or less, an excellent flexibility can be imparted to the coating film. The organic resin (A) may be responsible for increasing the followability of the coating film with respect to the material that may undergo deformation at the time of press forming, and for preventing the occurrence of cracking or peeling in the coating film. It may be an essential requirement that the glass transition temperature of the organic resin (B) is more than 100° C. By designing the glass transition temperature to be more than 100° C., an excellent strength can be imparted to the coating, and the organic resin (B) may be responsible for preventing the coating film from scratching or separation to be caused by the rubbing thereof with a metal mold at the time of the press forming. On the other hand, if the glass transition temperature of the organic resin (B) exceeds 250° C., the flexibility of the coating film may be seriously impaired. For this reason, it may be an essential requirement that the glass transition temperature of the organic resin (B) is 250° C. or less. In addition, it may also be an essential requirement that the difference between the glass transition temperatures of the organic resins (A) and (B) is 50° C. or more. If the difference between the glass transition temperatures of the organic resins (A) and (B) is less than 50° C., the effect of combining the above-mentioned characteristic features of the organic resins (A) and (B) may be reduced, and when the difference in the glass transition temperatures of 50° C. or more is established, a coating film excellent in both of the strength and the flexibility can be formed. The difference between the glass transition temperatures of the organic resins (A) and (B) may be preferably less than 180° C. That is, the difference between the glass transition temperatures of the organic resins (A) and (B) may preferably be from 50° C. to less than 180° C., more preferably from 70° C. to less than 150° C. In a case where severe forming process such as forming by heavy ironing-deep drawing, it is known that the temperature of the material may rise even up to 100 to 150° C. For responding to such press forming, it may be preferred that the glass transition temperature of the organic resin (A) is 100° C. or less, and at the same time, the glass transition temperature of the organic resin (B) is more than 150° C. In other words, when the organic resin (A) is in a rubbery state and the organic resin (A) is in a vitreous state, excellent strength and flexibility of the coating film can be guaranteed.

The surface-treated metal material according to the present invention having a coating film containing two kinds of organic resins (A) and (B) having different glass transition temperatures each in a specific range disposed on the metal material, may be obtained by a method where an aqueous coating material containing two kinds of aqueous organic resins (A') and (B') having different glass transition temperatures each in a specific range is applied on the surface of a metal material, and the coating is then dried by heating. Such an embodiment may be included in the present invention. By using an aqueous coating material, as described above, the requirement of growing environmental consciousness can be met and in addition, this may have an advantage of, for example, being able to reduce the cost involved in the equipment investment and in the production.

That is, the gist of the present invention resides in the followings.

[1] A surface-treated metal material, comprising: a metal material, and a coating film disposed on the surface thereof, the coating film containing (A) an organic resin having a glass transition temperature of more than 35° C. and not more than 100° C., and (B) an organic resin having a glass transition temperature of more than 100° C. and not more than 250° C., wherein the difference between the glass transition temperatures of the organic resins (A) and (B) is 50° C. or more.

[2] The surface-treated metal material according to [1], wherein the glass transition temperature of the organic resin (A) is more than 50° C. and not more than 100° C.

[3] The surface-treated metal material according to [1] or [2], wherein the glass transition temperature of the organic resin (B) is more than 150° C. to not more than 250° C.

[4] The surface-treated metal material according to any one of [1] to [3], wherein the organic resins (A) and (B) contain an anionic functional group.

[5] The surface-treated metal material according to any one of [1] to [4], wherein the organic resin (A) is a polyolefin resin or a polyurethane resin.

[6] The surface-treated metal material according to any one of [1] to [5], wherein the organic resin (B) is a polyurethane resin.

[7] The surface-treated metal material according to any one of [1] to [6], wherein a mixed resin of the organic resins (A) and (B) has a tensile strength at 20° C. of 20 N/mm$^2$ or more and a total elongation at 20° C. of 20% or more.

[8] The surface-treated metal material according to any one of [1] to [7], wherein the coating film further contains (C) silica.

[9] The surface-treated metal material according to any one of [1] to [8], wherein the coating film further contains a crosslinked structure formed between (D) at least one crosslinking agent selected from a silane coupling agent, a carbodiimide compound, an epoxy compound, an organic titanate compound and a melamine resin, and at least one member selected from the organic resin (A), the organic resin (B) and the silica (C).

[10] The surface-treated metal material according to any one of [1] to [9], wherein the coating film contains a siloxane bond or a chemical bond formed between a silanol group and another functional group.

[11] The surface-treated metal material according to any one of [1] to [10], wherein the coating film further contains (E) a phosphoric acid compound.

[12] The surface-treated metal material according to any one of [1] to [11], wherein the coating film further contains (F) a lubricity imparting agent.

[13] A process for producing a surface-treated metal material, comprising coating a surface of a metal material with an aqueous coating material containing (A') an aqueous organic resin having a glass transition temperature of more than 35° C. to not more than 100° C. and (B') an aqueous resin having a glass transition temperature of more than 100° C. to not more than 250° 0, so that the difference between the glass transition temperatures of the aqueous organic resins (A') and (B') being 50° C. or more, and then drying the coating by heating to thereby form a coating film.

[14] The process for producing a surface-treated metal material according to [13], wherein the glass transition temperature of the aqueous organic resin (A') is more than 50° C. to not more than 100° C.

[15] The process for producing a surface-treated metal material according to [13] or [14], wherein the glass transition temperature of the aqueous organic resin (B') is more than 150° C. to not more than 250° C.

[16] The process for producing a surface-treated metal material according to any one of [13] to [15], wherein the aqueous organic resins (A') and (B) contain an anionic functional group.

[17] The process for producing a surface-treated metal material according to [16], wherein the anionic functional group is neutralized with an amine compound and the boiling point of the amine compound is not more than the maximum temperature of the metal material at the drying under heating to thereby form the coating film.

[18] The process for producing a surface-treated metal material according to any one of [13] to [17], wherein the aqueous organic resin (A') is a polyolefin resin or a polyurethane resin.

[19] The process for producing a surface-treated metal material according to any one of [13] to [18], wherein the aqueous organic resin (B') is a polyurethane resin.

[20] The process for producing a surface-treated metal material according to any one of [13] to [19], wherein the aqueous coating material further contains (C') a water-dispersible silica.

[21] The process for producing a surface-treated metal material according to any one of [13] to [20], wherein the aqueous coating material further contains (D) at least one crosslinking agent selected from a silane coupling agent, a carbodiimide compound, an epoxy compound, and an organic titanate compound.

[22] The process for producing a surface-treated metal material according to any one of [13] to [21], wherein the aqueous coating material further contains (E) a phosphoric acid compound.

[23] The process for producing a surface-treated metal material according to any one of [13] to [22], wherein the aqueous coating material further contains (F) a lubricity imparting agent.

[24] The process for producing a surface-treated metal material according to any one of [13] to [23], wherein the dry thickness of the coating film is from 0.1 to 5 μm.

[25] The process for producing a surface-treated metal material according to any one of [13] to [24], wherein the maximum temperature of the metal material at the drying under heating to thereby form the coating film satisfies the condition of from Tg_A (° C.) to Tg_B (° C.) (wherein Tg_A (° C.) and Tg_B (° C.) represent the glass transition temperatures of the aqueous organic resins (A) and (B), respectively).

[26] A surface-treated metal material comprising a metal material having on the surface thereof a coating film formed by the process for producing according to any one of [13] to [25].

Effect of the Invention

The present invention may provide a surface-treated metal material having a coating which does not contain an environmental load substance such as hexavalent chromium and is particularly excellent in the scratch resistance, the press formability and the corrosion resistance after the shape processing thereof, and also a process for producing such a metal material.

MODES FOR CARRYING OUT THE INVENTION

Hereinbelow, modes for carrying out the present invention will be described.

The surface-treated metal material according to the present invention may be obtained by forming, on a surface of a metal material, a coating film containing (A) an organic resin having a glass transition temperature of more than 35° C. to not more than 100° C., and (B) an organic resin having a glass transition temperature of more than 100° C. to not more than 250° C., so that the difference between the glass transition temperatures of the organic resins (A) and (B) is 50° C. or more. Also, the process for producing a surface-treated metal material according to the present invention may be a process comprising: coating a surface of a metal material with an aqueous coating material containing (A') an aqueous organic resin having a glass transition temperature of more than 35° C. to not more than 100° C., and (B') an aqueous resin having a glass transition temperature of more than 100° C. to not more than 250° C., so that the difference between the glass transition temperatures of the aqueous organic resins (A') and (B') is 50° C. or more, and then drying the coating by heating to thereby form a coating film. The method of measuring the glass transition temperature may not be particularly limited. Specific examples the method may include: differential thermal analysis method (DTA), differential scanning calorimetry (DSC), thermogravimetric measurement (TG), thermomechanical analysis (TMA) and dynamic viscoelastic measurement (DMA). Among these methods, a method using a viscoelasticity spectrometer appearing hereinafter may be preferred. As the glass transition temperature measured in this way, it may be preferred to employ an average value of measurements performed plural times.

The organic resins (A) and (B) may not be particularly limited in their kind, as long as the resins have a glass transition of more than 35° C. to not more than 100° C. and a glass transition temperature of more than 100° C. to not more than 250° C., respectively, and the difference between the respective glass transition temperatures is 50° C. or more. Specific examples of the resins may include: epoxy resins, phenol resins, polyester resins, polyurethane resins, an acrylic resins, polyolefin resins, and modification products thereof. As the organic resins (A) and (B), resins of the same kind may be used, or different kinds of resins may also be used. Each of the organic resins (A) and (B) may be a resin comprising two or more kinds of organic resins. The organic resin (A) may preferably be a polyolefin resin or a polyurethane resin, because a relatively low glass transition temperature may easily be designed, and the formation of an aqueous formulation containing such a resin may also be facilitated. In a case where the corrosion resistance and/or cost is important, a relatively inexpensive polyolefin resin with good barrier property may be suitable. In a case where the scratch resistance and/or press formability is important, a polyurethane resin excellent in the mechanical property (i.e., a relationship between the tensile strength and the elongation of the resin) may be suitable. The organic resin (B) may preferably be a polyurethane resin, because a relatively high glass transition temperature may easily be designed and the formation of an aqueous formulation containing such a resin may also be facilitated. The method of raising the glass transition temperature may not be particularly limited, but may include, for example, a method of introducing many functional groups with a relatively high cohesive energy, such as urea group, urethane group, amide group, phenyl group and carbonate group, into the molecule. The functional group may be obtained by copolymerizing a monomer containing such a functional group or may be a functional group produced by a chemical reaction of functional groups with each other. For example, a urea group may be produced by a reaction of an isocyanate group and an amino group; a urethane group may be produced by a reaction of an isocyanate group and a hydroxyl group; and an amide group may produced by a reaction of an amino group and a carboxyl group. Two or more of these functional groups may be contained in the molecule. The method of lowering the glass transition temperature may not be particularly limited. For example, in order to attain such a purpose, it is preferred to select a resin containing as little the above-mentioned functional group with a relatively high cohesive energy as possible, and comprising an alkylene group, an ether group or the like having a relatively low cohesive energy. Also, a large number of organic resins having various glass transition temperatures may be commercially available, and these resins may be utilized in the present invention without causing any problem.

The above epoxy resin may not be particularly limited, and examples thereof may include: epoxy resins such as bisphenol A-type epoxy resin, bisphenol F-type epoxy resin, resorcin (or resorcinol)-type epoxy resin, hydrogenated bisphenol A-type epoxy resin, hydrogenated bisphenol F-type epoxy resin and novolak-type epoxy resin, and a resin which is to be obtained by subjecting a acrylic resin having a high acid value to radical polymerization, in the presence of the above-mentioned epoxy resin, etc.

The phenol resin above may not be particularly limited, and examples thereof may include; phenol resins such as methylol-modified phenol resin, which is to be obtained by an addition reaction of an aromatic compound such as phenol, resorcin, cresol, bisphenol A and para-xylylene dimethyl ether, with formaldehyde in the presence of a reaction catalyst.

The above polyester resin may not be particularly limited, and examples thereof may include: resins which are to be obtained by dehydrating condensing a polyhydric alcohol such as ethylene glycol, propylene glycol, diethylene glycol, 1,6-hexanediol, neopentyl glycol, triethylene glycol, bisphenol hydroxypropyl ether, glycerin, trimethylolethane and trimethylolpropane, with a polybasic acid, such as phthalic anhydride, isophthalic acid, terephthalic acid, succinic anhydride, adipic acid, sebacic acid, maleic anhydride, itaconic acid, fumaric acid and himic anhydride.

The above polyurethane resin may not be particularly limited, and examples thereof may include: resins which are to be obtained by reacting a polyisocyanate compound with a polyol compound and then further extending the chain of the resultant product with an amino group-containing compound. The polyisocyanate compound may not be particularly limited as long as it is a compound having two or more isocyanate groups per one molecule, and examples thereof may include: aliphatic isocyanates, alicyclic diisocyanates, aromatic diisocyanates, aromatic-aliphatic diisocyanates, and mixtures thereof. The polyol compound may not be particularly limited as long as it is a compound having two or more hydroxyl groups per one molecule, and examples thereof include: polycarbonate polyols, polyester polyols, polyether polyols, polyesteramide polyols, acrylic polyols, polyurethane polyols, and mixtures thereof. The above chain extender may not be particularly limited as long as it is a compound containing one or more active hydrogen within the molecule, and examples thereof may include: aliphatic polyamines such as ethylenediamine, propylenediamine, hexamethylenediamine, diethylenetriamine, dipropylenetriamine, triethylenetetramine and tetraethylenepentamine, aromatic polyamines such as tolylenediamine, xylylenediamine and diaminodiphenylmethane, alicyclic polyamines such as diaminocyclohexylmethane, piperazine, 2,5-dimethylpiperazine and isophoronediamine, hydrazines such as hydrazine, succinic acid dihydrazide, adipic acid dihydrazide and phthalic acid dihydrazide, and alkanolamines such as hydroxyethyldiethylenetriamine, 2-[(2-aminoethyl)amino]ethanol and 3-aminopropanediol. One of these compounds may be used alone, or two or more kinds thereof may be used as a mixture, as desired.

The above acrylic resin may not be particularly limited, and examples thereof may include: resins which are to be obtained by subjecting a unsaturated monomer such as styrene, alkyl(meth)acrylate, (meth)acrylic acid, hydroxyalkyl (meth)acrylate and alkoxysilane (meth)acrylate, to a radical polymerization in a solvent by using a polymerization initiator. The polymerization initiator may not be particularly limited, and example thereof may include, for example, persulfates such as potassium persulfate and ammonium persulfate, or azo compounds such as azobiscyanovaleric acid and azobisisobutyronitrile. Herein, the term "(meth)acryl" refers to "acryl or methacryl".

Examples of the above polyolefin resin may include: resins which are to be obtained by subjecting ethylene and an unsaturated carboxylic acid to a copolymerization reaction at a high temperature under a high pressure. Examples of the unsaturated carboxylic acid may include: methacrylic acid, acrylic acid, maleic acid, fumaric acid, itaconic acid, crotonic acid, isocrotonic acid, citraconic acid, allylsuccinic acid, mesaconic acid, glutaconic acid, nadic acid, methylnadic acid, tetrahydrophthalic acid, and methylhexahydrophthalic acid.

Each of the organic resins (A) and (B) may preferably contain an anionic functional group. The anionic functional group may be excellent in the hydrophilicity and therefore, this functional group may be suitable for forming an aqueous formulation of the organic resin, and may have an important role in guaranteeing the stability in an aqueous coating material when formed into an aqueous formulation. Herein, the "stability in an aqueous coating material" refers to that an aggregate or precipitate attributable to the resin is not produced in the aqueous coating material, or the coating material itself is not thickened remarkably or solidified. In addition, the above functional group may also have an effect of enhancing the adherence with respect to an underlying metal (in a case where a plated layer is provided, with respect to the plated layer; and in a case where a primer layer is provided, with respect to the primer layer), or the with respect to a topcoat material. The anionic functional group may not be particularly limited, and examples thereof may include: carboxyl group, sulfone group, phosphoric acid group, and mercapto group. Among these, the carboxyl group may be preferred for the purpose of satisfying both of aqueous formulation, stability in the aqueous coating material, and corrosion resistance (or water resistance). The method of incorporating a carboxyl group into the organic acids (A) or (B) may be, for example, a method of copolymerizing one or more kind of a compound having one or more active hydrogen group within the molecule, and a compound having a carboxyl group at the time of production of the organic resins (A) or (B). Examples of the compound having one or more active hydrogen group within the molecule and having a carboxyl group may include: carboxyl group-containing compounds such as 2,2-dimethylolpropionic acid, 2,2-dimethylolbutyric acid, 2,2-dimethylolvaleric acid, dioxymaleic acid, 2,6-dioxybenzoic acid and 3,4-diaminobenzoic acid, derivatives thereof, or polyester polyols which are to be obtained by copolymerizing such a compound; and carboxyl group-containing compounds which are to be obtained by reacting an anhydride group-containing compound such as maleic anhydride, phthalic anhydride, succinic anhydride, trimellitic anhydride and pyromellitic anhydride, with a compound having an active hydrogen group, a derivative thereof, or polyester polyols which are to be obtained by copolymerizing such a compound. At the time of the copolymerization, one of these compounds may be used alone, or two or more thereof may be used in combination, as desired.

The content of the carboxyl group in the resin may be, in terms of the acid equivalent thereof, preferably from 100 to 10,000 for both of the organic resins (A) and (B). If this content is less than 100, the hydrophilicity of the organic resin may be excessively increased, and in turn, the corrosion resistance after the shape processing thereof may be reduced. If the above content exceeds 10,000, the formation of an aqueous formulation containing the resin may be difficult, or storage stability of the aqueous coating material containing the resin may be decreased. The content of the carboxyl group within the molecule may be, in terms of the acid equivalent thereof, preferably from not less than 150 and not more than 5,000 for both resins.

In a case where the organic resins (A) and (B) are used after the formation thereof into an aqueous coating material as aqueous organic resins (A') and (B'), in order to enhance the corrosion resistance or the storage stability of the coating material, both resins may preferably contain a neutralizer for an anionic functional group. Examples of the neutralizer may include: basic substances such as ammonia, tertiary amine (e.g., trimethylamine, triethylamine, diethanolamine, triethanolamine, isopropanolamine, dimethylethanolamine), and hydroxides of alkali metal or alkaline earth metal (e.g., sodium hydroxide, potassium hydroxide, calcium hydroxide). One of these neutralizers may be used alone, or two or more thereof may be used as a mixture. Further, the neutralizer may preferably be an amine compound having a boiling point of not more than the maximum temperature of the metal material to be used at the time of drying under heating so as to form the coating film. If the boiling point exceeds the maximum temperature of the metal material to be used at the drying under heating, a large amount of the neutralizer may remain in the coating film after drying by baking thereof and the corrosion resistance of the coating film may be decreased. The boiling point of the neutralizer may preferably be 150° C. or less, more preferably 100° C. or less, for the purpose of facilitating the volatilization at the drying under heating. Among these, in view of, for example, the corrosion resistance or storage stability of the coating material, a neutralizer containing ammonia, trimethylamine or triethylamine may be more preferred.

As the method of incorporating the neutralizer, the neutralizer may be incorporated directly into the aqueous organic resins (A') and (B'), or may be incorporated at the time of the dissolution or dispersion of the aqueous organic resins (A) and (B) in an aqueous coating material. The content of the neutralizer in the coating film may preferably be large enough to neutralize 20% or more of the anionic functional group. If the content of the neutralizer is less than 20% thereof, the corrosion resistance or the storage stability of the coating material may be reduced.

A mixed resin of the organic resins (A) and (B) may preferably has a tensile strength at 20° C. of 20 N/mm² or more, and an entire elongation at 20° C. of 20% or more. If the tensile strength is less than 20 N/mm², the coating film may lack the strength and may deteriorate in the scratch resistance, the press formability and the corrosion resistance after the shape processing thereof. If the total elongation is less than 20%, the coating film may lack the flexibility and may deteriorate in the press formability or the corrosion resistance after the shape processing thereof. The tensile strength may be measured by separating (or peeling) the coating film from the metal material and performing a tensile test. Alternatively, it is also possible that the underlying metal material having thereon the coating film is directly subjected to a tensile test so as to determine the tensile strength thereof, and a calculated value of the tensile strength of the coating film may be obtained by subtracting the tensile strength of the underlying metal material from the above tensile strength. The tensile strength may be more preferably 30 N/mm² or more. The total elongation may be measured by separating the coating film from the underlying metal material and performing a tensile test of the coating film itself, or by performing a tensile test directly on the underlying metal material with a coating film, and the elongation at the time of the occurrence of cracking in the coating film may be measured as the total elongation of the coating film. The total elongation may be more preferably 30% or more.

The contents of the organic resins (A) and (B) in the coating film may preferably be in the ranges represented by the following mathematical formulae:

$$1/9 \leq Ga/Gb \leq 9/1$$

$$5 \leq Ga+Gb \leq 95$$

Ga: the content (mass %) of the organic resin (A) in the coating film, and

Gb: the content (mass %) of the organic resin (B) in the coating film.

If (Ga/Gb) is less than 1/9, a coating film with sufficient flexibility may not be obtained, and cracking or separation of the coating film may occur at the time of the forming process to thereby incur whitening of the appearance or reduction in the corrosion resistance. If the (Ga/Gb) exceeds 9/1, a coating film with adequate strength may not be obtained, and damaging or separation of the coating film may occur at the time of the forming process to thereby incur blackening of the appearance or reduction in the corrosion resistance. The (Ga/Gb) may be more preferably from 2/8 to 8/2.

If (Ga+Gb) is less than 5, a coating film with sufficient strength and flexibility may not be obtained. On the other hand, if (Ga+Gb) exceeds 95, the strength and flexibility of the coating film may be unprofitably or uneconomically saturated. The (Ga+Gb) may be more preferably not less than 10 and not more than 90.

The coating film containing the organic resins (A) and (B) may be in an either uniformly or non-uniformly dispersed state, as long as the organic resins (A) and (B) are present together in the coating film. More specifically, the coating film may be in any of the dispersed states, for example, where either one resin is partially concentrated with respect to the coating film surface or where a two-layer structure is partially formed with respect to the coating film cross-section.

The coating film may preferably further contain (C) silica. By containing the silica (C) in the coating film, the scratch resistance or the corrosion resistance after the shape processing thereof may be increased. The content of the silica in the coating film may preferably be, in terms of Si, preferably from 1 to 30 mass % based on the solid content of the coating film. If the content is less than 1 mass %, the addition effect may be poor, whereas if it exceeds 30 mass %, the flexibility of the coating film may be reduced and the press formability or the corrosion resistance after the shape processing thereof may be decreased. The content of the silica (C) may be more preferably form 5 to 20 mass %. The silica (C) may be not particularly limited in the kind as long as it can be stably dispersed in the coating material, and a known silica such as colloidal silica and vapor-phase silica may be used. In the case of adding the silica to an aqueous coating material, (C') a water-dispersible silica such as colloidal silica may preferably be used. Among these, colloidal silica fine particle having a primary particle size of 5 to 50 nm may be more preferred, because when this is used, the effect of enhancing the corrosion resistance may be distinctively brought out. Examples of the commercially available product include: "Snowtex O", "Snowtex OS", "Snowtex OXS", "Snowtex N", "Snowtex NS", "Snowtex NXS", "Snowtex 20", "Snowtex 30", "Snowtex 40", "Snowtex MP-1040", "Snowtex MP-2040", "Snowtex MP-3040", and "Snowtex MP-4540M" (all mfd. by Nissan Chemicals Industries, Ltd.). One of these silica products may be used alone, or two or more thereof may be used in combination.

The coating film may preferably further contain a crosslinked structure to be formed between (D) at least one crosslinking agent selected from silane coupling agents, carbodiimide compounds, epoxy compounds, organic titanate compounds and melamine resins; and a functional group contained in at least one component selected from the organic resin (A), the organic resin (B) and the silica (C). The crosslinking density of the coating film may be increased by containing a crosslinked structure, and the strength and flexibility of the coating film may be enhanced. The method of introducing this crosslinked structure may not be particularly limited but may include a method of adding the crosslinking agent (D) to an aqueous coating material containing the aqueous organic resin (A'), the aqueous organic resin (B'), the water-dispersible silica (C') and the like and forming a crosslinked structure when coating the aqueous coating material on the surface of a metal material and drying it by heating. The content of the crosslinking agent (D) in the coating film may preferably be from 1 to 30 mass % based on the solid content of the coating film.

The silane coupling agent above may not be particularly limited, and examples thereof may include a monomer, a derivative and a polymer commercially available from Shin-Etsu Chemical Co., Ltd., Unitika Ltd., Chisso Corporation and Toshiba Silicones, such as vinyltrimethoxysilane, vinyltriethoxysilane, γ-aminopropyltrimethoxysilane, γ-aminopropyltriethoxysilane, γ-aminopropyldimethoxysilane, γ-aminopropyldiethoxysilane, 2-(3,4-epoxycyclohexyl)ethyltrimethoxysilane, N-phenyl-γ-aminopropyltrimethoxysilane, γ(2-aminoethyl)aminopropyltrimethoxysilane, γ-(2-aminoethyl)aminopropyltriethoxysilane, γ-(2-aminoethyl)aminopropyldimethoxysilane, γ-(2-aminoethyl)aminopropyldiethoxysilane, γ-mercaptopropyltrimethoxysilane and γ-mercaptopropyldimethoxysilane. Two or more kinds of silane coupling agents may be used in combination. In view of reactivity with the resin, the silane coupling agent may be more preferably a silane coupling agent containing an epoxy group or an amino group within the molecule.

The above carbodiimide compound may not be particularly limited as long as it is a compound containing a plurality of carbodiimide groups within the molecule and not impairing the stability of the processing agent, and examples thereof may include: aromatic carbodiimide compounds aliphatic carbodiimide compounds. Examples of the commercially available product may include: CARBODILITE V-02, CARBODILITE V-02-L2, CARBODILITE E-01, CARBODILITE E-02, CARBODILITE E-03A, and CARBODILITE E-04 (all mfd. by Nisshinbo Industries, Inc.).

The above epoxy compound may not be particularly limited, as long as it is a compound not impairing the stability of the processing agent, and examples thereof may include diglycidyl adipate, diglycidyl phthalate, diglycidyl terephthalate, sorbitan polyglycidyl ether, pentaerythritol polyglycidyl ether, glycerin polyglycidyl ether, trimethylpropane polyglycidyl ether, neopentyl glycol polyglycidyl ether, ethylene glycol diglycidyl ether, polyethylene glycol diglycidyl ether, propylene glycol diglycidyl ether, polypropylene glycol diglycidyl ether, 2,2-bis-(4'-glycidyloxyphenyl)propane, tris(2,3-epoxypropyl)isocyanurate, bisphenol A diglycidyl ether, and hydrogenated bisphenol A diglycidyl ether.

The above organic titanium compound may not be particularly limited as long as it is a compound having a plurality of functional groups capable of reacting with a carboxyl group or a hydroxyl group, and not impairing the stability of the processing agent, but examples thereof may include dipropoxy-bis(triethanolaminato)titanium, dipropoxy-bis(diethanolaminato)titanium, propoxy-tris(diethanolaminato)titanium, dibutoxy-bis(triethanolaminato)titanium, dibutoxy-bis(diethanolaminato)titanium, dipropoxy-bis(acetylacetonato)titanium, dibutoxy-bis(acetylacetonato)titanium, dihydroxy-bis(lactato)titanium monoammonium salt, dihydroxy-bis(lactato)titanium diammonium salt, propanedioxytitanium-bis(ethyl acetoacetate), oxotitaniumbis(monoammonium oxalate), and isopropyltri(N-amidoethyl.aminoethyl)titanate. Examples of the commercially available product may include Organics TC-100, TC-200, TC-300, TC-310, TC-315, TC-400, TC-401 and TC-750 (all mfd. by Matsumoto Seiyaku Kogyo K.K.).

The coating film may preferably, contain a siloxane bond or a chemical bond formed between a silanol group and another functional group. Such a chemical bond may be formed with utilization of a relatively low thermal energy, and this may be suitable particularly when introducing a crosslinked structure while drying the aqueous coating material at a relatively low temperature. When the crosslinked structure is introduced and the crosslinking density of the coating film is thereby increased, the strength and flexibility of the coating film may be enhanced. In addition, the silanol group may form a chemical bond with the underlying metal material (in a case where having a plated layer, with the plated layer) and therefore, the adherence between the underlying metal material (in a case where having a plated layer, the plated layer) and the coating film may be increased, so that the press formability and the corrosion resistance after the shape processing thereof can be further enhanced.

The method of introducing the siloxane bond or the bond formed between a silanol group and another functional group into the coating film may not be particularly limited, but examples thereof may include a method of using an aqueous coating material containing aqueous organic resins (A') and (B') which contain a silanol group in the resin, the water-dispersible silica (C'), the silane coupling agent and the like, and introducing the bond at the drying under heating when forming the coating film. The content of the siloxane bond or the chemical bond formed between a silanol group and another functional group, in the coating film may preferably be, in terms of Si, from 0.01 to 30 mass % based on the nonvolatile solid content of all resins in the coating film. If the content is less than 0.01 mass %, the introduction effect may not be obtained, whereas if the content exceeds 30 mass %, the flexibility of the coating film may be reduced, and the press formability or the corrosion resistance after the shape processing thereof may deteriorate.

The coating film may preferably further contain (E) a phosphoric acid group in an amount of, in terms of phosphorus, from 0.01 to 5 mass % based on the solid content of the coating film. The phosphoric acid compound may react with the surface of the underlying metal such as iron or zinc plating to form a sparingly soluble deposition film and thereby may enhance the corrosion resistance or the adherence between the coating film and the underlying metal material. If the content of the phosphoric acid compound (E) is, in terms of phosphorus, less than 0.01 mass % based on the solid content of the coating film, the effect may be poor, whereas if it exceeds 5 mass %, the hydrophilicity of the coating film may be increased and the corrosion resistance may be reduced. One of these phosphorus compounds may be used alone, or two or more thereof may be used in combination.

The phosphorus acid compound (E) may not be particularly limited as long as it is a compound incapable of impairing the stability of the processing agent, but examples thereof may include: ammonium phosphorus-based compound such as triammonium phosphate, diammonium hydrogen phosphate and ammonium dihydrogen phosphate, a potassium phosphate-based compound such as potassium phosphate and potassium dihydrogen phosphate, a sodium phosphate-based compound such as trisodium phosphate, disodium hydrogen phosphate and sodium dihydrogen phosphate, calcium dihydrogen phosphate, magnesium hydrogen phosphate, and magnesium dihydrogen phosphate.

The coating film may preferably further contain (F) a lubricity imparting agent. By containing (F) a lubricity imparting agent in the coating film, the lubricity of the coating film may be enhanced. As a result, friction between the press mold and the coating film at the time of press forming may be reduced, and damage or separation of the coating film may be suppressed. That is, the press formability and the corrosion resistance after the shape processing thereof may be enhanced. Examples of the lubricity imparting agent (F) include a water-dispersible polyethylene resin, a tetrafluoroethylene resin, a stearic acid compound, and a natural paraffin wax. Among these, a polyethylene resin and a tetrafluoroethylene resin may be preferred, because when these are used, the lubricity imparting effect may be markedly brought out.

The content of the lubricity imparting agent (F) in the coating film may preferably be, in terms of the solid content, from 1 to 30 mass % based on the solid content of the coating film. If the content is less than 1 mass %, the effect may be poor, whereas if it exceeds 30 mass %, the lubricity imparting effect may be saturated and at the same time, the strength and flexibility of the coating film may be reduced to bring about deterioration in the scratch resistance, the press formability and the like.

The metal material for used in the surface-treated metal material may not be particularly limited, but examples thereof may include iron, iron-base alloy, aluminum, aluminum-base alloy, copper, copper-base alloy, and a stainless steel. A plated metal material after arbitrarily applying plating on a metal material may also be used. The plated metal material may not be particularly limited, but examples thereof include a zinc-based electroplated, dip-dipped or deposition plated metal material such as zinc plated metal material, zinc-nickel plated metal material, zinc-iron plated metal material, zinc-chromium plated metal material, zinc-aluminum plated metal material, zinc-titanium plated metal material, zinc-magnesium plated metal material and zinc-manganese plated metal material, an aluminum or aluminum alloy plated metal material, a lead or lead alloy plated metal material, a tin or tin alloy plated metal material, and a metal material where in the plated layer above, as a small amount of a dissimilar metal element or impurity, cobalt, molybdenum, tungsten, nickel, titanium, chromium, aluminum, manganese, lead, iron, magnesium, tin, copper, cadmium, arsenic or the like is contained or an inorganic material such as silica, alumina and titania is dispersed. Further, multiplayer plating where the plating above is combined with other kinds of plating, for example, with iron plating or iron-phosphorus plating, may also be applied. The plating method may not be particularly limited and may be any known method such as electroplating, hot-dip plating, deposition plating, dispersion plating and vacuum plating. Also, before surface preparation, the metal material above may be subjected to a normal treatment such as hot water washing and alkali degreasing.

The method of coating the coating material on the surface of the metal material may not be particularly limited, but, for example, roll coating, air spraying, airless spraying or immersion may be appropriately used.

The method of drying under heating after the coating above may not be particularly limited, but for increasing the air-drying or degassing effect or the curability of the coating film, the drying under heating may preferably be performed, for example, by a known method using a hot-air drying furnace, an induction heating furnace, a near infrared furnace or a direct heating furnace, a method of previously heating the metal material which is a material to be coated, or a combination method thereof. Depending on the kind of the organic resin used, the coating may be cured with an energy ray such as ultraviolet ray and electron beam.

The maximum temperature (° C.) of the metal material at the drying under heating may preferably satisfy the condition of from $Tg\_A$ (° C.) to $Tg\_B$ (T). Herein, $Tg\_A$ (° C.) and $Tg\_B$ (° C.) represent the glass transition temperatures of the organic resins (A) and (B), respectively. When the maximum temperature is set to be from $Tg\_A$ (° C.) to $Tg\_B$ (° C.), the organic resin (A) may change from a vitreous state to a rubbery state, and the softened resin may flow into the irregularities on the metal material surface (in a case where having a plating, on the plating surface), whereby an adherence enhancing effect by an anchoring action may be obtained or an effect of accelerating the fusion of resins with each other and thereby enhancing the strength or flexibility of the coating film may be obtained. If the maximum temperature is less than $Tg\_A$ (° C.), the filming property of the coating film may be reduced and the press formability or the corrosion resistance after the shape processing thereof may be decreased. If the maximum temperature exceeds $Tg\_B$ (° C.), the excessive heating may not only cause reduction in the flexibility of the coating film but also be disadvantageous in view of energy cost. The maximum temperature may be more preferably from more than 100° C. to less than 150° C. The drying time at the drying after coating may preferably be from 1 second to 5 minutes. Also, the cooling after drying by baking may be performed by a known method such as water cooling and air cooling, or a combination thereof.

The dry thickness of the coating film may preferably be from 0.1 to 5 μm. If the thickness is less than 0.1 μm, the scratch resistance or the corrosion resistance after the shape processing thereof may be reduced, whereas if it exceeds 5 μm, the filming property of the coating film may be decreased, and this may not only cause reduction in the press formability but also be unprofitable. The dry thickness may be more preferably from 0.2 to 2 μm. The dry thickness as used herein refers to an average value of film thicknesses at respective portions when the coating film is microscopically observed from the cross-sectional direction at arbitrary 10 portions.

In the present invention, for the purpose of enhancing the corrosion resistance or adherence of the coating film, one or more layers of chemical conversion coating such as phosphate treatment coating may be added on the surface of the metal material (in a case where having a plated layer, the plating layer) before forming the coating film. Also, in a case where having a plated layer, the treatment employable as a post-plating treatment before the chemical conversion treatment may include, for example, a zero-spangle treatment which is a treatment for making the appearance uniform after hot-dip plating, an annealing treatment which is a treatment for modifying the plated layer, and a temper rolling treatment for adjusting the surface conditions or the quality of material, and in the present invention, these treatments may be applied without any particular limitation.

In the present invention, the amount of the compound used, the amount of the functional group, and the like can be quantitatively determined by using a known method such as mass analysis, fluorescent X-ray analysis, nuclear magnetic resonance spectrometry, infrared spectrometry, X-ray photoelectron spectrometry, X-ray microanalyzer, visible-ultraviolet spectroscopy and infrared spectroscopy, or by combining these methods.

EXAMPLES

Hereinbelow, the present invention will be described in more detail with reference to Examples.

The following metal sheets X1 to X7 were prepared as the underlying metal material for a surface-treated metal material, and were subjected to alkali degreasing, water washing and drying. The following metal sheet "X8" was a metal sheet which had been prepared by subjecting the metal sheet X1 to alkali degreasing, water washing and drying, and then applying thereto a chemical conversion treatment appearing hereinafter.

X1: A zinc electroplated steel sheet; thickness of sheet: 1.0 mm, amount of plating: 20 g/m$^2$.

X2: A zinc-10% Ni alloy electroplated steel sheet; thickness of sheet: 0.8 mm, amount of plating: 20 g/m$^2$.

X3: A hot-dip galvanized steel sheet; thickness of sheet: 0.9 mm, amount of plating: 50 g/m$^2$.

X4: An alloyed hot-dip galvanized steel sheet; thickness of sheet: 0.8 mm, amount of plating: 45 g/m$^2$, Fe: 10%.

X5: A hot-dipped zinc-11%Al-3% Mg-0.2% Si steel sheet; thickness of sheet: 0.8 mm, amount of plating: 60 g/m$^2$ X6: A hot-dipped zinc-55% Al-1.6% Si steel sheet; thickness of sheet: 0.8 mm, amount of plating: 75 g/m$^2$.

X7: A stainless steel sheet; thickness of sheet: 0.5 mm, ferrite-based stainless steel sheet; steel component: C: 0.008 mass %, Si: 0.07 mass %, Mn: 0.15 mass %, P: 0.011 mass %, S: 0.009 mass %, Al: 0.067 mass %, Cr: 17.3 mass %, Mo: 1.51 mass %, N: 0.0051 mass %, Ti: 0.22 mass %, balance: Fe and unavoidable impurities.

X8: A steel sheet obtained by coating the surface of X1 with a Cr-free chemical conversion solution containing a silane coupling agent and a tannic acid, and drying the coating (amount of chemical conversion coating: 100 mg/m$^2$, drying temperature: 70° C.).

Subsequently, each of Coating Materials Z1 to Z44, which had been prepared by mixing each of the following Aqueous Resins Y1 to Y20 with various additives in accordance with the formulation shown in Tables 1 and 2 appearing hereinafter, was applied onto the metal sheet as described above, and dried in a hot-air drying furnace at a furnace temperature of 300° C. In this way, the surface-treated metal materials of Example Nos. 1 to 57 according to the present invention, and those of Comparative Example Nos. 58 to 69 were produced. As to the test piece examined for the press formability and the corrosion resistance after press forming, the above-mentioned coating materials were applied onto both surfaces thereof.

<Aqueous Resin Y1: Polyurethane Resin>

80 Gram of polyester polyol having an average molecular weight of 900, which was synthesized from an adipic acid with a hydroxyl group at the terminal and a 1,4-butylene glycol, 120 g of bisphenol A-propylene oxide 3 mol adduct having an average molecular weight of 700, and 12 g of 2,2-bis(hydroxymethyl)propionic acid were added to 100 g of N-methyl-2-pyrrolidone and dissolved under heating at 80° C. Thereafter, 100 g of hexamethylene diisocyanate was added thereto, and the mixture was reacted for 2 hours under heating at 110° C. The reaction solution was neutralized by adding 11 g of triethylamine (boiling point: 89° C.), and the resulting solution was added dropwise with vigorous stirring to an aqueous solution prepared by mixing 5 g of ethylenediamine and 570 g of deionized water, whereby a polyurethane resin was obtained. The glass transition temperature of the obtained polyurethane resin was 85° C.

<Aqueous Resin Y2: Polyurethane Resin>

230 Gram of polyester polyol having an average molecular weight of 900, which was synthesized from an adipic acid with a hydroxyl group at the terminal and a 1,4-butylene glycol and 15 g of 2,2-bis(hydroxymethyl)propionic acid were added to 100 g of N-methyl-2-pyrrolidone and dissolved under heating at 80° C. Thereafter, 100 g of hexamethylene diisocyanate was added thereto, and the mixture was reacted for 2 hours under heating at 110° C. The reaction solution was neutralized by adding 11 g of triethylamine (boiling point: 89° C.), and the resulting solution was added dropwise with vigorous stirring to an aqueous solution prepared by mixing 5 g of ethylenediamine and 570 g of deionized water, whereby a polyurethane resin was obtained. The glass transition temperature of the obtained polyurethane resin was 30° C.

<Aqueous Resin Y3: Polyurethane Resin>

In a four-necked flask equipped with a stirrer, a Dimroth condenser, a nitrogen inlet tube, a silica gel drying tube and a thermometer, 155.87 g of 4,4'-methylenebis(cyclohexyl isocyanate), 27.36 g of dimethylolpropionic acid, 1.93 g of neopentyl glycol, 4.39 g of 1,6-hexanediol, 111.38 g of a polyester polyol being comprising adipic acid, neopentyl glycol and 1,6-hexanediol and having a molecular weight of 1,000, and 130 g of N-methylpyrrolidone as a solvent were added and stirred at 80° C. for 4 hours in a nitrogen atmosphere. After confirming that the amine equivalent reached a predetermined value, the reaction solution was cooled to 40° C. and then subjected to a neutralization reaction by adding 20.00 g of triethylamine (boiling point: 89° C.) to obtain an N-methylpyrrolidone solution of a polyurethane prepolymer. In an aqueous solution prepared by dissolving 7.77 g of hydrazine monohydrate in 543.81 g of water, 436.41 g of the polyurethane prepolymer obtained above was dispersed by using a homodisper to obtain a polyurethane resin. The glass transition temperature of the obtained polyurethane resin was 115° C.

<Aqueous Resin Y4: Polyurethane Resin>

A four-necked flask equipped with a stirrer, a Dimroth condenser, a nitrogen inlet tube, a silica gel drying tube and a thermometer was added with 155.87 g of 4,4'-methylenebis (cyclohexyl isocyanate), 27.36 g of dimethylolpropionic acid, 1.93 g of neopentyl glycol, 4.39 g of 1,6-hexanediol, 111.38 g of a polyester polyol being comprising adipic acid, neopentyl glycol and 1,6-hexanediol and having a molecular weight of 1,000, and 130 g of N-methylpyrrolidone as a solvent and stirred at 80° C. for 4 hours in a nitrogen atmosphere. After confirming that the amine equivalent reached a predetermined value, the reaction solution was cooled to 40° C. and then subjected to a neutralization reaction by adding 20.00 g of triethylamine (boiling point: 89° C.) to obtain an N-methylpyrrolidone solution of a polyurethane prepolymer. In an aqueous solution prepared by dissolving 7.77 g of hydrazine monohydrate and 4.67 g of γ-(2-aminoethyl)aminopropyltrimethoxysilane in 543.81 g of water, 436.41 g of the polyurethane prepolymer obtained above was dispersed by using a homodisper to obtain a polyurethane resin containing a silanol group. The glass transition temperature of the obtained polyurethane resin was 145° C.

<Aqueous Resin Y5: Polyurethane Resin>

In a four-necked flask equipped with a stirrer, a Dimroth condenser, a nitrogen inlet tube, a silica gel drying tube and a thermometer, 145.37 g of 1,3-bis(isocyanatomethyl)cyclohexane, 20.08 g of dimethyloipropionic acid, 15.62 g of neopentyl glycol, 74.93 g of polycarbonate diol having a molecular weight of 1,000, and 64.00 g of acetonitrile as a solvent were added, then heated to 75° C. in a nitrogen atmospHerein, and stirred for 3 hours. After confirming that the amine equivalent reached a predetermined value, the reaction solution was cooled to 40° C., and 20.00 g of triethylamine (boiling point: 89° C.) was added to obtain an acetonitrile solution of a polyurethane prepolymer. Thereafter, 327.82 g of this solution was dispersed in 700.00 g of water by using a homodisper to make an emulsion and then caused to undergo a chain extension reaction by holding the solution at 40° C. and adding 35.66 g of ethylenediamine hydrazine monohydrate as a chain extender. Subsequently, acetonitrile used at the synthesis of polyurethane prepolymer was removed by distillation from the resulting reaction solution at 50° C. under reduced pressure of 150 mmHg to obtain a polyurethane resin. The glass transition temperature of the obtained polyurethane resin was 158° C.

<Aqueous Resin Y6: Polyurethane Resin>

In a four-necked flask equipped with a stirrer, a Dimroth condenser, a nitrogen inlet tube, a silica gel drying tube and a thermometer, 145.37 g of 1,3-bis(isocyanatomethyl)cyclohexane, 20.08 g of dimethylolpropionic acid, 15.62 g of neopentyl glycol, 74.93 g of polycarbonate diol having a molecular weight of 1,000, and 64.00 g of acetonitrile as a solvent, were added, then heated to 75° C. in a nitrogen atmosphere in, and stirred for 3 hours. After confirming that the amine equivalent reached a predetermined value, the reaction solution was cooled to 40° C., and 20.00 g of triethylamine (boiling point: 89° C.) was added to obtain an acetonitrile solution of a polyurethane prepolymer. Thereafter, 327.82 g of this solution was dispersed in 700.00 g of water by using a homodisper to make an emulsion and then caused to undergo a chain extension reaction by holding the solution at 40° C. and adding, as chain extenders, 21.43 g of γ-(2-aminoethyl)aminopropyltrimethoxysilane and 17.83 g of ethylenediamine hydrazine monohydrate. Subsequently, acetonitrile used at the synthesis of polyurethane prepolymer was removed by distillation from the resulting reaction solution at 50° C. under reduced pressure of 150 mmHg to obtain a polyurethane resin containing a silanol group. The glass transition temperature of the obtained polyurethane resin was 195° C.

<Aqueous Resin Y7: Polyurethane Resin>

In a four-necked flask equipped with a stirrer, a Dimroth condenser, a nitrogen inlet tube, a silica gel drying tube and a thermometer, 145.37 g of 1,3-bis(isocyanatomethyl)cyclohexane, 20.08 g of dimethylolpropionic acid, 15.62 g of neopentyl glycol, 74.93 g of polycarbonate diol having a molecular weight of 1,000, and 64.00 g of acetonitrile as a solvent were added, then heated to 75° C. in a nitrogen atmospHerein, and stirred for 3 hours. After confirming that the amine equivalent reached a predetermined value, the reaction solution was cooled to 40° C., and 20.00 g of triethylamine (boiling point: 89° C.) was added to obtain an acetonitrile solution of a polyurethane prepolymer. Thereafter, 327.82 g of this solution was dispersed in 700.00 g of water by using a homodisper to make an emulsion and then caused to undergo a chain extension reaction by holding the solution at 40° C. and adding 42.86 g of γ-(2-aminoethyl)aminopropyltrimethoxysilane as a chain extender. Subsequently, acetonitrile used at the synthesis of polyurethane prepolymer was removed by distillation from the resulting reaction solution at 50° C. under reduced pressure of 150 mmHg to obtain a polyurethane resin containing a silanol group. The glass transition temperature of the obtained polyurethane resin was 230° C.

<Aqueous Resin Y8: Polyurethane Resin>

In a four-necked flask equipped with a stirrer, a Dimroth condenser, a nitrogen inlet tube, a silica gel drying tube and a thermometer, 145.37 g of 1,3-bis(isocyanatomethyl)cyclohexane, 20.08 g of dimethylolpropionic acid, 15.62 g of neopentyl glycol, 74.93 g of polycarbonate diol having a molecular weight of 1,000, and 64.00 g of acetonitrile as a solvent were added, then heated to 75° C. in a nitrogen atmospHerein, and stirred for 3 hours. After confirming that the amine equivalent reached a predetermined value, the reaction solution was cooled to 40° C., and 20.00 g of triethylamine (boiling point: 89° C.) was added to obtain an acetonitrile solution of a polyurethane prepolymer. Thereafter, 327.82 g of this solution was dispersed in 700.00 g of water by using a homodisper to make an emulsion and then caused to undergo a chain extension reaction by holding the solution at 40° C. and adding 64.29 g of γ-(2-aminoethyl)aminopropyltrimethoxysilane as a chain extender. Subsequently, acetonitrile used at the synthesis of polyurethane prepolymer was removed by distillation from the resulting reaction solution at 50° C. under reduced pressure of 150 mmHg to obtain a polyurethane resin containing a silanol group. The glass transition temperature of the obtained polyurethane resin was 270° C.

<Aqueous Resin Y9: Acrylic Resin>

A flask equipped with a nitrogen purging tube, an Allihn condenser, a dropping funnel and a mechanical stirrer was charged with 200 g of propylene glycol monomethyl ether and heated to 90° C. and in a state of keeping the temperature at 90° C., a mixture containing 10 g of styrene, 80 g of tert-butyl acrylate, 10 g of 2-hydroxyethyl acrylate and 1 g of azobisisobutyronitrile was added dropwise to the flask over 3 hours. After the completion of dropwise addition, the system was further held at 90° C. for 2 hours and then cooled to room temperature to obtain an aqueous acrylic resin. The glass transition temperature of the obtained acrylic resin was 33° C. Thereafter, propylene glycol monomethyl ether was removed by distillation therefrom under reduced pressure until the nonvolatile content became 83%, and then, 14.6 g of dimethylethanolamine (boiling point: 135° C.) and water were added to obtain an aqueous acrylic resin having a nonvolatile content of 50% and a residual propylene glycol monomethyl ether amount of 10%.

<Aqueous Resin Y10: Acrylic Resin>

A flask equipped with a nitrogen purging tube, an Allihn condenser, a dropping funnel and a mechanical stirrer was charged with 200 g of propylene glycol monomethyl ether and heated to 90° C. and in a state of keeping the temperature at 90° C., a mixture containing 55 g of styrene, 5 g of n-butyl acrylate, 20 g of 2-hydroxyethyl acrylate, 20 g of N-methylacrylamide and 1 g of azobisisobutyronitrile was added dropwise to the flask over 3 hours. After the completion of dropwise addition, the system was further held at 90° C. for 2 hours and then cooled to room temperature to obtain an aqueous acrylic resin. The glass transition temperature of the obtained acrylic resin was 78° C. Thereafter, propylene glycol monomethyl ether was removed by distillation therefrom under reduced pressure until the nonvolatile content became 83%, and then, 14.6 g of dimethylethanolamine (boiling point: 135° C.) and water were added to obtain an aqueous acrylic resin having a nonvolatile content of 50% and a residual propylene glycol monomethyl ether amount of 10%.

<Aqueous Resin Y11: Polyolefin Resin>

In a reaction vessel, 100 g of a polyolefin resin (ethylene-methacrylic acid copolymer) copolymerized at a methacrylic acid content of 20 mass %, 5.6 g of sodium hydroxide and 500 g of water were added and stirred at 95° C. for 2 hours to obtain an aqueous polyolefin resin. The glass transition temperature of the obtained polyolefin resin was 55° C.

<Aqueous Resin Y12: Polyurethane Resin>

In a four-necked flask equipped with a stirrer, a Dimroth condenser, a nitrogen inlet tube, a silica gel drying tube and a thermometer, 145.37 g of 1,3-bis(isocyanatomethyl)cyclohexane, 20.08 g of dimethylolpropionic acid, 15.62 g of neopentyl glycol, 74.93 g of polycarbonate diol having a molecular weight of 1,000, and 64.00 g of acetonitrile as a solvent were added, then heated to 75° C. in a nitrogen atmospHerein, and stirred for 3 hours. After confirming that the amine equivalent reached a predetermined value, the reaction solution was cooled to 40° C., and 50.00 g of aqueous ammonia (concentration: 25 mass %) (boiling point: −33° C.) was added to obtain an acetonitrile solution of a polyurethane prepolymer. Thereafter, 327.82 g of this solution was dispersed in 700.00 g of water by using a homodisper to make an emulsion and then caused to undergo a chain extension reaction by holding the solution at 40° C. and adding, as chain extenders, 21.43 g of γ-(2-aminoethyl)aminopropyltrimethoxysilane and 17.83 g of ethylenediamine hydrazine monohydrate. Subsequently, acetonitrile used at the synthesis of polyurethane prepolymer was removed by distillation from the resulting reaction solution at 50° C. under reduced pressure of 150 mmHg to obtain a polyurethane resin containing a silanol group. The glass transition temperature of the obtained polyurethane resin was 190° C.

<Aqueous Resin Y13: Polyurethane Resin>

In a four-necked flask equipped with a stirrer, a Dimroth condenser, a nitrogen inlet tube, a silica gel drying tube and a thermometer, 145.37 g of 1,3-bis(isocyanatomethyl)cyclohexane, 20.08 g of dimethylolpropionic acid, 15.62 g of neopentyl glycol, 74.93 g of polycarbonate diol having a molecular weight of 1,000, and 64.00 g of acetonitrile as a solvent were added, then heated to 75° C. in a nitrogen atmospHerein, and stirred for 3 hours. After confirming that the amine equivalent reached a predetermined value, the reaction solution was cooled to 40° C., and 20.00 g of dimethylethanolamine (boiling point: 135° C.) was added to obtain an acetonitrile solution of a polyurethane prepolymer. Thereafter, 327.82 g of this solution was dispersed in 700.00 g of water by using a homodisper to make an emulsion and then caused to undergo a chain extension reaction by holding the solution at 40° C. and adding, as chain extenders, 21.43 g of γ-(2-aminoethyl)aminopropyltrimethoxysilane and 17.83 g of ethylenediamine hydrazine monohydrate. Subsequently, acetonitrile used at the synthesis of polyurethane prepolymer was removed by distillation from the resulting reaction solution at 50° C. under reduced pressure of 150 mmHg to obtain a polyurethane resin containing a silanol group. The glass transition temperature of the obtained polyurethane resin was 193° C.

<Aqueous Resin Y14: Polyurethane Resin>

In a four-necked flask equipped with a stirrer, a Dimroth condenser, a nitrogen inlet tube, a silica gel drying tube and a thermometer, 145.37 g of 1,3-bis(isocyanatomethyl)cyclohexane, 20.08 g of dimethylolpropionic acid, 15.62 g of neopentyl glycol, 74.93 g of polycarbonate diol having a molecular weight of 1,000, and 64.00 g of acetonitrile as a solvent were added, then heated to 75° C. in a nitrogen atmospHerein, and stirred for 3 hours. After confirming that the amine equivalent reached a predetermined value, the reaction solution was cooled to 40° C., and 20.00 g of diethanolamine (boiling point: 269° C.) was added to obtain an acetonitrile solution of a polyurethane prepolymer. Thereafter, 327.82 g of this solution was dispersed in 700.00 g of water by using a homodisper to make an emulsion and then caused to undergo a chain extension reaction by holding the solution at 40° C. and adding, as chain extenders, 21.43 g of γ-(2-aminoethyl)aminopropyltrimethoxysilane and 17.83 g of ethylenediamine hydrazine monohydrate. Subsequently, acetonitrile used at the synthesis of polyurethane prepolymer was removed by distillation from the resulting reaction solution at 50° C. under reduced pressure of 150 mmHg to obtain a polyurethane resin containing a silanol group. The glass transition temperature of the obtained polyurethane resin was 185° C. 6<Aqueous Resin Y15: Acrylic Resin>

A flask equipped with a nitrogen purging tube, an Allihn condenser, a dropping funnel and a mechanical stirrer was charged with 100 g of propylene glycol monomethyl ether and heated to 105° C. and in a state of keeping the temperature at 105° C., a mixture containing 30 g of methyl methacrylate, 10 g of acrylic acid, 15 g of 2-hydroxy methacrylate, 20 g of lauryl methacrylate, 25 g of 2-ethylhexyl acrylate and 5 g of benzoyl peroxide was added dropwise to the flask over 3 hours. After the completion of dropwise addition, the system was held at 105° C. for 1 hour, and 0.5 g of benzoyl peroxide was added. The system was further kept for 1 hour and then cooled to room temperature to obtain an aqueous acrylic resin. The glass transition temperature of the obtained acrylic resin was −10° C. Thereafter, propylene glycol monomethyl ether was removed by distillation therefrom under reduced pressure until the nonvolatile content became 83%, and then, 14.6 g of dimethylethanolamine (boiling point: 135° C.) and water were added to obtain an aqueous acrylic resin having a nonvolatile content of 50% and a residual propylene glycol monomethyl ether amount of 10%.

<Aqueous Resin Y16: Polyolefin Resin>

In a reaction vessel, 100 g of a polyolefin resin (ethylene-methacrylic acid copolymer) copolymerized at a methacrylic acid content of 20 mass %, 15.8 g of aqueous ammonia (concentration: 25 mass %) (boiling point: −33° C.) and 500 g of water were added and stirred at 95° C. for 2 hours to obtain an aqueous polyolefin resin. The glass transition temperature of the obtained polyolefin resin was 45° C.

<Aqueous Resin Y17: Polyurethane Resin>

200 Gram of polyester polyol having an average molecular weight of 900, which was synthesized from an adipic acid with a hydroxyl group at the terminal and a 1,4-butylene glycol, 25 g of bisphenol A-propylene oxide 3 mol adduct having an average molecular weight of 700, and 14 g of 2,2-bis(hydroxymethyl)propionic acid were added to 100 g of N-methyl-2-pyrrolidone and dissolved under heating at 80° C. Thereafter, 100 g of hexamethylene diisocyanate was added thereto, and the mixture was reacted for 2 hours under heating at 110° C. The reaction solution was neutralized by adding 11 g of triethylamine (boiling point: 89° C.), and the resulting solution was added dropwise with vigorous stirring to an aqueous solution prepared by mixing 5 g of ethylenediamine and 570 g of deionized water, whereby a polyurethane resin was obtained. The glass transition temperature of the obtained polyurethane resin was 45° C.

<Aqueous Resin Y18: Polyurethane Resin>

50 Gram of polyester polyol having an average molecular weight of 900, which was synthesized from an adipic acid with a hydroxyl group at the terminal and a 1,4-butylene glycol, 140 g of bisphenol A-propylene oxide 3 mol adduct having an average molecular weight of 700, and 11 g of 2,2-bis(hydroxymethyl)propionic acid were added to 100 g of N-methyl-2-pyrrolidone and dissolved under heating at 80° C. Thereafter, 100 g of hexamethylene diisocyanate was added thereto, and the mixture was reacted for 2 hours under heating at 110° C. The reaction solution was neutralized by adding 11 g of triethylamine (boiling point: 89° C.), and the resulting solution was added dropwise with vigorous stirring to an aqueous solution prepared by mixing 5 g of ethylenediamine and 570 g of deionized water, whereby a polyurethane resin was obtained. The glass transition temperature of the obtained polyurethane resin was 102° C.

<Aqueous Resin Y19: Polyurethane Resin>

SUPERFLEX 620 (glass transition temperature: 43° C., containing a cationic functional group) mfd. by Dai-Ichi Kogyo Seiyaku Co., Ltd. was used.

<Aqueous Resin Y20: Polyester Resin>

Vylonal MD-1200 (glass transition temperature: 67° C., containing a sulfonate group as an anionic functional group) mfd. by Toyobo Co., Ltd. was used.

The contents of Silicon Oxide (C), Crosslinking Agent (D), Phosphoric Acid Compound (E) and Lubricity Imparting Agent (F) as additives in the coating material shown in Tables 1 and 2 are as follows.

Silicon Oxide C1: colloidal silica, Snowtex N (mfd. by Nissan Chemicals Industries, Ltd.)

Silicon Oxide C2: colloidal silica, Snowtex NS (mfd. by Nissan Chemicals Industries, Ltd.)

Silicon Oxide C3: colloidal silica, Snowtex 30 (mfd. by Nissan Chemicals Industries, Ltd.)

Crosslinking Agent D1: A carbodiimide compound, CARBODILITE E-03A (mfd. by Nisshinbo Industries, Inc.)

Crosslinking Agent D2: An organic titanate compound, Orgatics TC-400 (mfd. by Matsumoto Seiyaku Kogyo K.K.)

Crosslinking Agent D3: A silane coupling agent (epoxy compound, 3-glycidoxypropyltrimethoxysilane (KBM-403, mfd. by Shin-Etsu Chemical Co., Ltd.)

Crosslinking Agent D4: An epoxy compound, glycerol polyglycidyl ether (EX-313, mfd. by Nagase ChemteX Corporation)

Crosslinking Agent D5: A melamine resin, CYMEL 303 (mfd. by Nihon Cytec Industries Inc.)

Phosphoric Acid Compound E1: Trisodium phosphate 12 hydrate

Phosphoric Acid Compound E2: Anhydrous disodium hydrogen phosphate

Phosphoric Acid Compound E3: Anhydrous diammonium hydrogen phosphate

Lubricity Imparting Agent F1: Polyethylene-based, CHEMIPEARL W500 (mfd. by Mitsui Chemicals, Inc.)

Lubricity Imparting Agent F2: Polyethylene-based, CHEMIPEARL WF640 (mfd. by Mitsui Chemicals, Inc.)

Lubricity Imparting Agent F3: Polyethylene-based, CHEMIPEARL W700 (mfd. by Mitsui Chemicals, Inc.)

Herein, the dynamic viscoelasticity of a free film of the resin was measured using a viscoelasticity spectrometer, Model VES (manufactured by Iwamoto Seisakusyo K.K.), under the conditions of a vibration frequency of 10 Hz, a temperature rise rate of 5.0° C./min, a sample length of 5 cm and an amplitude of 0.01 mm, and from the peak temperature of the loss tangent (tan δ) thereof, the glass transition temperature of Aqueous Resins Y1 to Y11 was determined. Also, as for the total elongation and tensile strength of the coating film, by pulling a free film of the coating film at a tensile rate of 5 mm/min in the same direction as the coating direction of the film with use of a compact tensile tester (manufactured by Rheometric Scientific), the total elongation was determined from the elongation (%) at breakage and the tensile strength was determined from the stress (N/mm$^2$) at breakage. Each of the glass transition temperature, total elongation and tensile test was measured three times, and an average value thereof was determined. As for the process for producing of the free film, a coating material for forming the film was bar-applied on a PP sheet, dried by baking at 150° C. for 5 minutes and allowed to cool, and the film formed was separated from the PP sheet film. Incidentally, the film was formed to a constant thickness of 30 μm.

TABLE 1

Compositions of Coating Materials Z1 to Z22: the numerical value in the parenthesis is mass % based on the entire solid content of the coating material

| Coating Material No. | Organic Resin (A) | | Organic Resin (B) | | Other Organic Resin | | Difference in Glass Transition Temperature Between (A) and (B) | Remarks |
|---|---|---|---|---|---|---|---|---|
| | Kind | Glass Transition Temperature Tg_A [° C.] | Kind | Glass Transition Temperature, Tg_B [° C.] | Kind | Glass Transition Temperature [° C.] | | |
| Z1 | Y11 (30) | 55 | Y7 (38) | 230 | — | — | 175 | Example |
| Z2 | Y11 (30) | 55 | Y5 (38) | 158 | — | — | 103 | |
| Z3 | Y11 (30) | 55 | Y5 (19), Y7 (19) | 158, 230 | — | — | 175 | |
| Z4 | Y10 (30) | 78 | Y7 (38) | 230 | — | — | 152 | |
| Z5 | Y10 (30) | 78 | Y6 (38) | 195 | — | — | 117 | |
| Z6 | Y10 (15), Y11 (15) | 78, 55 | Y6 (38) | 195 | — | — | 140 | |
| Z7 | Y11 (30) | 55 | Y7 (38) | 230 | — | — | 175 | |
| Z8 | Y11 (37) | 55 | Y6 (37) | 195 | — | — | 140 | |
| Z9 | Y1 (37) | 85 | Y6 (37) | 195 | — | — | 110 | |
| Z10 | Y20 (37) | 67 | Y6 (37) | 195 | — | — | 128 | |
| Z11 | Y16 (37) | 45 | Y6 (37) | 195 | — | — | 150 | |
| Z12 | Y17 (37) | 45 | Y6 (37) | 195 | — | — | 150 | |
| Z13 | Y19 (37) | 43 | Y6 (37) | 195 | — | — | 152 | |
| Z14 | Y1 (37) | 85 | Y12 (37) | 190 | — | — | 105 | |
| Z15 | Y1 (37) | 85 | Y13 (37) | 193 | — | — | 108 | |
| Z16 | Y1 (37) | 85 | Y14 (37) | 185 | — | — | 100 | |
| Z17 | Y11 (37) | 55 | Y3 (37) | 115 | — | — | 60 | |
| Z18 | Y11 (37) | 55 | Y4 (37) | 145 | — | — | 90 | |

TABLE 1-continued

Compositions of Coating Materials Z1 to Z22: the numerical value in the parenthesis is mass % based on the entire solid content of the coating material

| | | | | | | | | |
|---|---|---|---|---|---|---|---|---|
| Z19 | Y11 (37) | 55 | Y18 (37) | 105 | — | — | 50 | |
| Z20 | Y11 (60) | 55 | Y6 (14) | 195 | — | — | 140 | |
| Z21 | Y11 (14) | 55 | Y6 (60) | 195 | — | — | 140 | |
| Z22 | Y11 (9) | 55 | Y6 (65) | 195 | — | — | 140 | |

| Coating Material No. | Additive | | | | Characteristics of Coating Film | | Remarks |
|---|---|---|---|---|---|---|---|
| | Silica (C) | Crosslinking Agent (D) | Phosphoric Acid Compound (E) | Lubricity Imparting Agent (F) | Total Elongation of Resin [%] | Tensile Strength of Resin [MPa] | |
| Z1 | C1 (20) | D3 (10) | E1 (1) | F1 (1) | 50 | 40 | Example |
| Z2 | C2 (20) | D1 (10) | E3 (1) | F2 (1) | 65 | 30 | |
| Z3 | C3 (20) | D1 (10) | E1 (1) | F2 (1) | 57 | 35 | |
| Z4 | C1 (20) | D3 (10) | E2 (1) | F3 (1) | 30 | 50 | |
| Z5 | C2 (20) | D2 (10) | E1 (1) | F1 (1) | 40 | 45 | |
| Z6 | C1 (20) | D2 (10) | E2 (1) | F1 (1) | 45 | 40 | |
| Z7 | C1 (20) | D4 (10) | E1 (1) | F1 (1) | 50 | 40 | |
| Z8 | C1 (20) | D3 (3) | E3 (1) | F2 (2) | 57 | 35 | |
| Z9 | C1 (20) | D3 (3) | E3 (1) | F2 (2) | 50 | 40 | |
| Z10 | C1 (20) | D5 (10) | E3 (1) | F2 (2) | 40 | 40 | |
| Z11 | C1 (20) | D3 (3) | E3 (1) | F2 (2) | 60 | 30 | |
| Z12 | C1 (20) | D3 (3) | E3 (1) | F2 (2) | 60 | 35 | |
| Z13 | C1 (20) | D3 (3) | E3 (1) | F2 (2) | 55 | 30 | |
| Z14 | C1 (20) | D3 (3) | E3 (1) | F2 (2) | 50 | 40 | |
| Z15 | C1 (20) | D3 (3) | E3 (1) | F2 (2) | 50 | 40 | |
| Z16 | C1 (20) | D3 (3) | E3 (1) | F2 (2) | 50 | 40 | |
| Z17 | C1 (20) | D3 (3) | E3 (1) | F2 (2) | 80 | 20 | |
| Z18 | C1 (20) | D3 (3) | E3 (1) | F2 (2) | 70 | 25 | |
| Z19 | C1 (20) | D3 (3) | E3 (1) | F2 (2) | 85 | 20 | |
| Z20 | C1 (20) | D3 (3) | E3 (1) | F2 (2) | 100 | 15 | |
| Z21 | C1 (20) | D3 (3) | E3 (1) | F2 (2) | 20 | 70 | |
| Z22 | C1 (20) | D3 (3) | E3 (1) | F2 (2) | 15 | 85 | |

TABLE 2

Compositions of Coating Materials Z23 to Z44: the numerical value in the parenthesis is mass % based on the entire solid content of the coating material

| Coating Material No. | Resin Components | | | | | | Difference in Glass Transition Temperature Between (A) and (B) | Remarks |
|---|---|---|---|---|---|---|---|---|
| | Organic Resin (A) | | Organic Resin (B) | | Other Organic Resin | | | |
| | Kind | Glass Transition Temperature Tg_A [° C.] | Kind | Glass Transition Temperature, Tg_B [° C.] | Kind | Glass Transition Temperature [° C.] | | |
| Z23 | Y11 (37) | 55 | Y6 (37) | 195 | — | — | 140 | Example |
| Z24 | Y11 (37) | 55 | Y6 (37) | 195 | — | — | 140 | |
| Z25 | Y11 (37) | 55 | Y6 (37) | 195 | — | — | 140 | |
| Z26 | Y11 (37) | 55 | Y6 (37) | 195 | — | — | 140 | |
| Z27 | Y11 (37) | 55 | Y6 (37) | 195 | — | — | 140 | |
| Z28 | Y11 (37) | 55 | Y6 (37) | 195 | — | — | 140 | |
| Z29 | Y11 (37) | 55 | Y6 (37) | 195 | — | — | 140 | |
| Z30 | Y11 (37) | 55 | Y6 (37) | 195 | — | — | 140 | |
| Z31 | Y11 (37) | 55 | Y6 (37) | 195 | — | — | 140 | |
| Z32 | Y1 (37) | 85 | Y4 (37) | 145 | — | — | 60 | |
| Z33 | Y11 (74) | 55 | — | — | — | — | — | Comparative Example |
| Z34 | Y1 (37) | 85 | — | — | — | — | — | |
| Z35 | — | — | Y6 (37) | 195 | — | — | — | |
| Z36 | — | — | Y4 (37) | 145 | — | — | — | |
| Z37 | Y1 (37) | 85 | Y3 (37) | 115 | — | — | 30 | |
| Z38 | Y10 (30) | 78 | Y3 (37) | 115 | — | — | 37 | |
| Z39 | — | — | Y6 (37) | 195 | Y2 (37) | 30 | — | |
| Z40 | — | — | Y6 (37) | 195 | Y15 (37) | −10 | — | |
| Z41 | — | — | Y6 (37) | 195 | Y9 (37) | 33 | — | |
| Z42 | Y11 (74) | 55 | — | — | Y8 (37) | 270 | — | |
| Z43 | Y10 (37), Y11 (37) | 78, 55 | — | — | — | — | — | |
| Z44 | — | — | Y5 (37), Y7 (37) | 158, 230 | — | — | — | |

TABLE 2-continued

Compositions of Coating Materials Z23 to Z44: the numerical value in the parenthesis is mass % based on the entire solid content of the coating material

| Coating Material No. | Additive | | | | Characteristics of Coating Film | | Remarks |
|---|---|---|---|---|---|---|---|
| | Silica (C) | Crosslinking Agent (D) | Phosphoric Acid Compound (E) | Lubricity Imparting Agent (F) | Total Elongation of Resin [%] | Tensile Strength of Resin [MPa] | |
| Z23 | | | | | 57 | 35 | Example |
| Z24 | C1 (20) | | | | 57 | 35 | |
| Z25 | | D3 (3) | | | 57 | 35 | |
| Z26 | | | E3 (1) | | 57 | 35 | |
| Z27 | | | | F2 (2) | 57 | 35 | |
| Z28 | | D3 (3) | E3 (1) | F2 (2) | 57 | 35 | |
| Z29 | C1 (20) | | E3 (1) | F2 (2) | 57 | 35 | |
| Z30 | C1 (20) | D3 (3) | | F2 (2) | 57 | 35 | |
| Z31 | C1 (20) | D3 (3) | E3 (1) | | 57 | 35 | |
| Z32 | C1 (20) | D3 (3) | E3 (1) | F2 (2) | 65 | 30 | |
| Z33 | C1 (20) | D3 (10) | E1 (1) | F1 (1) | 150 | 5 | Comparative Example |
| Z34 | C1 (20) | D3 (10) | E1 (1) | F1 (1) | 45 | 30 | |
| Z35 | C1 (20) | D3 (10) | E1 (1) | F1 (1) | 5 | 90 | |
| Z36 | C1 (20) | D3 (10) | E1 (1) | F1 (1) | 10 | 65 | |
| Z37 | C1 (20) | D3 (10) | E1 (1) | F1 (1) | 60 | 10 | |
| Z38 | C1 (20) | D3 (10) | E1 (1) | F1 (1) | 65 | 10 | |
| Z39 | C1 (20) | D3 (10) | E1 (1) | F1 (1) | 50 | 25 | |
| Z40 | C1 (20) | D3 (10) | E1 (1) | F1 (1) | 60 | 10 | |
| Z41 | C1 (20) | D3 (10) | E1 (1) | F1 (1) | 40 | 25 | |
| Z42 | C1 (20) | D3 (10) | E1 (1) | F1 (1) | 7 | 70 | |
| Z43 | C1 (20) | D3 (10) | E1 (1) | F1 (1) | 130 | 7 | |
| Z44 | C1 (20) | D3 (10) | E1 (1) | F1 (1) | 10 | 70 | |

The produced surface-treated metal materials were evaluated for the following performances (1) to (6). The results obtained are shown in Tables 3 to 5.

(1) Scratch Resistance

A metal sphere of 10 mm in diameter (stainless Steel SUS304) was moved back and forth once over the evaluation surface of the test piece under a load of 200 g at a speed of 150 mm/min, and the degree of scratching after moving the metal sphere back and forth was evaluated according to the following criteria. Incidentally, the test piece when moving the metal sphere back and force was tested at 35° C. and 50° C.

4: There is no scratch.

3: There is a trace but no scratch.

2: There are scratches in the coating film.

1: There is a scratch reaching the underlying metal material.

(2) Press Formability

Forming by a square cylindrical crank press was performed under the conditions of a punch size of 65 mm×155 mm rectangle, a punch shoulder radius of 10 mm, a die shoulder radius of 5 mm, a forming speed of 40 spm, a forming height of 50 mm and a blank holding pressure of 39.2 kN, and the appearance of the corner side surface part was evaluated with an eye according to the following criteria. The press was performed under two conditions, that is, non-oiling and oiling with press oil G-6231F (mfd. by Nihon Kohsakuyu Co., Ltd.), and in each press condition, the mold temperature was adjusted such that the test piece at the time of the forming was put into two temperature conditions, that is, 35° C. and 130° C. Thus, the forming was performed under four conditions in total.

5: There is no change in the appearance.

4: The coating film is partially scratched, but the scratch is kept from reaching the underlying metal material.

3: The coating film is mostly scratched, but the scratch is kept from reaching the underlying metal material.

2: The coating film is mostly scratched and partially separated, and the scratch is reaching the underlying metal material.

1: The coating film is mostly separated, and even the underlying metal material is scratched.

(3) Corrosion Resistance after the Shape Processing Thereof

Forming by a square cylindrical crank press was performed under the conditions of a punch size of 65 mm×155 mm rectangle, a punch shoulder radius of 10 mm, a die shoulder radius of 5 mm, a forming speed of 40 spm, a forming height of 50 mm and a blank holding pressure of 39.2 kN, and with respect to the corner side surface part, a salt spray test in accordance with JIS Z2371 was performed for 48 hours. The area ratio in which rust was made after the test was measured with an eye and evaluated according to the following criteria. Incidentally, the press was performed under two conditions, that is, non-oiling and oiling with press oil G-6231F (mfd. by Nihon Kohsakuyu Co., Ltd.), and in each press condition, the mold temperature was adjusted such that the test piece at the time of the forming was put into two temperature conditions, that is, 35° C. and 130° C. Thus, the forming was performed under four conditions in total.

5: No rusting.

4: Rusting of less than 1%.

3: Rusting of from 1% to less than 5%.

2: Rusting of from 5% to less than 20%.

1: Rusting of 20% or more.

TABLE 3

Coating Materials Used in Nos. 1 to 29 of the Invention, Coating Conditions Thereof, and Summary of Test Results

| Section | No. | Kind of Coating Material | Underlying Metal Material | Film Thickness [μm] | Achieving Sheet Temperature [°C] | Scratch Resistance | | Press Formability | | | | Corrosion Resistance after Press Forming | | | | Overall Judgment* |
|---|---|---|---|---|---|---|---|---|---|---|---|---|---|---|---|---|
| | | | | | | | | Non-Oiling | | Oiling | | Non-Oiling | | Oiling | | |
| | | | | | | 35° C. | 50° C. | 35° C. | 130° C. | 35° C. | 130° C. | 35° C. | 130° C. | 35° C. | 130° C. | |
| Example | 1 | Z1 | X1 | 1.0 | 140 | 4 | 4 | 5 | 5 | 5 | 5 | 5 | 5 | 5 | 5 | A |
| | 2 | Z2 | X1 | 1.1 | 140 | 4 | 4 | 5 | 5 | 5 | 5 | 5 | 5 | 5 | 5 | A |
| | 3 | Z3 | X1 | 1.1 | 140 | 4 | 4 | 5 | 5 | 5 | 5 | 5 | 5 | 5 | 5 | A |
| | 4 | Z4 | X1 | 1.2 | 140 | 4 | 4 | 5 | 5 | 5 | 5 | 5 | 4 | 5 | 4 | AB |
| | 5 | Z5 | X1 | 1.1 | 140 | 4 | 4 | 5 | 5 | 5 | 5 | 5 | 4 | 5 | 4 | AB |
| | 6 | Z6 | X1 | 1.1 | 140 | 4 | 4 | 5 | 5 | 5 | 5 | 5 | 4 | 5 | 5 | A |
| | 7 | Z7 | X1 | 1.0 | 140 | 4 | 4 | 5 | 5 | 5 | 5 | 5 | 5 | 5 | 5 | A |
| | 8 | Z8 | X1 | 1.0 | 140 | 4 | 4 | 5 | 5 | 5 | 5 | 5 | 5 | 5 | 5 | A |
| | 9 | Z9 | X1 | 1.0 | 140 | 4 | 4 | 5 | 5 | 5 | 5 | 5 | 5 | 5 | 5 | A |
| | 10 | Z10 | X1 | 1.0 | 140 | 4 | 4 | 5 | 5 | 5 | 5 | 5 | 4 | 5 | 4 | AB |
| | 11 | Z11 | X1 | 1.0 | 140 | 4 | 3 | 5 | 5 | 5 | 5 | 5 | 5 | 5 | 5 | A |
| | 12 | Z12 | X1 | 1.0 | 140 | 4 | 3 | 5 | 5 | 5 | 5 | 5 | 5 | 5 | 5 | A |
| | 13 | Z13 | X1 | 1.0 | 140 | 4 | 3 | 5 | 5 | 5 | 5 | 5 | 5 | 5 | 5 | A |
| | 14 | Z14 | X1 | 1.0 | 140 | 4 | 4 | 5 | 5 | 5 | 5 | 5 | 5 | 5 | 5 | A |
| | 15 | Z15 | X1 | 1.0 | 140 | 4 | 4 | 5 | 5 | 5 | 5 | 5 | 5 | 5 | 5 | A |
| | 16 | Z16 | X1 | 1.0 | 140 | 4 | 4 | 5 | 5 | 5 | 5 | 4 | 4 | 4 | 4 | AB |
| | 17 | Z17 | X1 | 1.0 | 140 | 4 | 4 | 5 | 4 | 5 | 4 | 5 | 4 | 5 | 4 | AB |
| | 18 | Z18 | X1 | 1.0 | 140 | 4 | 4 | 5 | 4 | 5 | 5 | 5 | 4 | 5 | 5 | AB |
| | 19 | Z19 | X1 | 1.0 | 140 | 4 | 4 | 5 | 3 | 5 | 4 | 5 | 3 | 5 | 4 | B |
| | 20 | Z20 | X1 | 1.0 | 140 | 4 | 3 | 5 | 4 | 5 | 4 | 5 | 4 | 5 | 4 | B |
| | 21 | Z21 | X1 | 1.0 | 140 | 4 | 4 | 5 | 4 | 5 | 4 | 5 | 3 | 5 | 4 | B |
| | 22 | Z22 | X1 | 1.0 | 140 | 4 | 4 | 4 | 4 | 5 | 4 | 4 | 4 | 5 | 4 | B |
| | 23 | Z23 | X1 | 1.0 | 140 | 3 | 3 | 4 | 3 | 3 | 3 | 3 | 3 | 3 | 3 | C |
| | 24 | Z24 | X1 | 1.0 | 140 | 4 | 3 | 4 | 4 | 4 | 3 | 4 | 3 | 4 | 3 | BC |
| | 25 | Z25 | X1 | 1.0 | 140 | 4 | 3 | 4 | 4 | 4 | 3 | 3 | 3 | 4 | 3 | BC |
| | 26 | Z26 | X1 | 1.0 | 140 | 3 | 3 | 4 | 3 | 3 | 3 | 4 | 4 | 4 | 4 | BC |
| | 27 | Z27 | X1 | 1.0 | 140 | 4 | 3 | 4 | 4 | 4 | 3 | 4 | 3 | 4 | 3 | BC |
| | 28 | Z28 | X1 | 1.0 | 140 | 4 | 4 | 5 | 5 | 5 | 5 | 5 | 4 | 4 | 4 | AB |
| | 29 | Z29 | X1 | 1.0 | 140 | 4 | 4 | 5 | 4 | 4 | 4 | 4 | 3 | 4 | 4 | B |

*Judgment: A: very excellent, B: excellent, C: usable, D: unusable, AB: intermediate between A and B, and BC: intermediate between B and C.

TABLE 4

Coating Materials Used in Nos. 30 to 57 of the Invention, Coating Conditions Thereof, and Summary of Test Results

| Section | No. | Kind of Coating Material | Underlying Metal Material | Film Thickness [μm] | Achieving Sheet Temperature [°C] | Scratch Resistance | | Press Formability | | | | Corrosion Resistance after Press Forming | | | | Overall Judgment* |
|---|---|---|---|---|---|---|---|---|---|---|---|---|---|---|---|---|
| | | | | | | | | Non-Oiling | | Oiling | | Non-Oiling | | Oiling | | |
| | | | | | | 35° C. | 50° C. | 35° C. | 130° C. | 35° C. | 130° C. | 35° C. | 130° C. | 35° C. | 130° C. | |
| Example | 30 | Z30 | X1 | 1.0 | 140 | 4 | 4 | 5 | 5 | 5 | 5 | 4 | 3 | 4 | 3 | B |
| | 31 | Z31 | X1 | 1.0 | 140 | 4 | 4 | 4 | 4 | 4 | 3 | 4 | 4 | 4 | 3 | BC |
| | 32 | Z32 | X1 | 1.0 | 140 | 4 | 4 | 5 | 5 | 5 | 5 | 5 | 4 | 5 | 5 | A |
| | 33 | Z8 | X1 | 0.05 | 140 | 3 | 3 | 3 | 3 | 3 | 3 | 3 | 3 | 3 | 3 | C |
| | 34 | Z8 | X1 | 0.1 | 140 | 4 | 3 | 4 | 3 | 4 | 3 | 3 | 3 | 4 | 3 | C |
| | 35 | Z8 | X1 | 2.0 | 140 | 4 | 4 | 5 | 5 | 5 | 5 | 5 | 5 | 5 | 5 | A |
| | 36 | Z8 | X1 | 5.0 | 140 | 4 | 4 | 5 | 5 | 5 | 5 | 5 | 5 | 5 | 5 | A |
| | 37 | Z8 | X1 | 5.5 | 140 | 4 | 4 | 5 | 4 | 5 | 4 | 5 | 5 | 5 | 5 | AB |
| | 38 | Z8 | X1 | 1.0 | 50 | 4 | 3 | 4 | 3 | 4 | 3 | 3 | 3 | 3 | 3 | C |
| | 39 | Z8 | X1 | 1.0 | 60 | 4 | 3 | 4 | 4 | 4 | 3 | 4 | 3 | 4 | 3 | BC |
| | 40 | Z8 | X1 | 1.0 | 80 | 4 | 4 | 5 | 4 | 5 | 5 | 5 | 4 | 5 | 4 | AB |
| | 41 | Z8 | X1 | 1.0 | 180 | 4 | 4 | 5 | 5 | 5 | 5 | 5 | 5 | 5 | 5 | A |
| | 42 | Z8 | X1 | 1.0 | 200 | 4 | 4 | 5 | 4 | 5 | 4 | 5 | 4 | 5 | 4 | AB |
| | 43 | Z8 | X2 | 1.0 | 140 | 4 | 4 | 5 | 5 | 5 | 5 | 5 | 5 | 5 | 5 | A |
| | 44 | Z15 | X2 | 1.0 | 140 | 4 | 4 | 5 | 5 | 5 | 5 | 5 | 5 | 5 | 5 | A |
| | 45 | Z8 | X3 | 1.0 | 140 | 4 | 4 | 5 | 5 | 5 | 5 | 5 | 5 | 5 | 5 | A |

TABLE 4-continued

Coating Materials Used in Nos. 30 to 57 of the Invention,
Coating Conditions Thereof, and Summary of Test Results

| Section | No. | Kind of Coating Material | Under- lying Metal Material | Film Thick- ness [μm] | Achieving Sheet Temper- ature [° C.] | Scratch Resistance 35° C. | Scratch Resistance 50° C. | Press Formability Non-Oiling 35° C. | Press Formability Non-Oiling 130° C. | Press Formability Oiling 35° C. | Press Formability Oiling 130° C. | Corrosion Resistance after Press Forming Non-Oiling 35° C. | Corrosion Resistance after Press Forming Non-Oiling 130° C. | Corrosion Resistance after Press Forming Oiling 35° C. | Corrosion Resistance after Press Forming Oiling 130° C. | Over- all Judg- ment* |
|---|---|---|---|---|---|---|---|---|---|---|---|---|---|---|---|---|
| | 46 | Z15 | X3 | 1.0 | 140 | 4 | 4 | 5 | 5 | 5 | 5 | 5 | 5 | 5 | 5 | A |
| | 47 | Z8 | X4 | 1.0 | 140 | 4 | 4 | 5 | 5 | 5 | 5 | 5 | 5 | 5 | 5 | A |
| | 48 | Z15 | X4 | 1.0 | 140 | 4 | 4 | 5 | 5 | 5 | 5 | 5 | 5 | 5 | 5 | A |
| | 49 | Z8 | X5 | 1.0 | 140 | 4 | 4 | 5 | 5 | 5 | 5 | 5 | 5 | 5 | 5 | A |
| | 50 | Z15 | X5 | 1.0 | 140 | 4 | 4 | 5 | 5 | 5 | 5 | 5 | 5 | 5 | 5 | A |
| | 51 | Z8 | X6 | 1.0 | 140 | 4 | 4 | 5 | 5 | 5 | 5 | 5 | 5 | 5 | 5 | A |
| | 52 | Z15 | X6 | 1.0 | 140 | 4 | 4 | 5 | 5 | 5 | 5 | 5 | 5 | 5 | 5 | A |
| | 53 | Z8 | X7 | 1.0 | 140 | 4 | 4 | 5 | 5 | 5 | 5 | 5 | 5 | 5 | 5 | A |
| | 54 | Z15 | X7 | 1.0 | 140 | 4 | 4 | 5 | 5 | 5 | 5 | 5 | 5 | 5 | 5 | A |
| | 55 | Z8 | X8 | 1.0 | 140 | 4 | 4 | 5 | 5 | 5 | 5 | 5 | 5 | 5 | 5 | A |
| | 56 | Z15 | X8 | 1.0 | 140 | 4 | 4 | 5 | 5 | 5 | 5 | 5 | 5 | 5 | 5 | A |
| | 57 | Z30 | X8 | 1.0 | 140 | 4 | 4 | 5 | 5 | 5 | 5 | 5 | 5 | 5 | 5 | A |

*Judgment: A: very excellent, B: excellent, C: usable, D: unusable, AB: intermediate between A and B, and BC: intermediate between B and C.

TABLE 5

Coating Materials Used in Nos. 58 to 69 of the Invention,
Coating Conditions Thereof, and Summary of Test Results

| Section | No. | Kind of Coating Material | Under- lying Metal Material | Film Thick- ness [μm] | Achieving Sheet Temper- ature [° C.] | Scratch Resistance 35° C. | Scratch Resistance 50° C. | Press Formability Non-Oiling 35° C. | Press Formability Non-Oiling 130° C. | Press Formability Oiling 35° C. | Press Formability Oiling 130° C. | Corrosion Resistance after Press Forming Non-Oiling 35° C. | Corrosion Resistance after Press Forming Non-Oiling 130° C. | Corrosion Resistance after Press Forming Oiling 35° C. | Corrosion Resistance after Press Forming Oiling 130° C. | Over- all Judg- ment* |
|---|---|---|---|---|---|---|---|---|---|---|---|---|---|---|---|---|
| Com- parative Exam- ple | 58 | Z33 | X1 | 1.0 | 140 | 4 | 3 | 3 | 1 | 3 | 1 | 3 | 1 | 3 | 1 | D |
| | 59 | Z34 | X1 | 1.0 | 140 | 4 | 4 | 4 | 2 | 4 | 3 | 4 | 2 | 4 | 2 | D |
| | 60 | Z35 | X1 | 1.0 | 140 | 4 | 4 | 2 | 2 | 2 | 2 | 2 | 2 | 2 | 2 | D |
| | 61 | Z36 | X1 | 1.0 | 140 | 4 | 4 | 3 | 2 | 3 | 3 | 3 | 2 | 3 | 3 | D |
| | 62 | Z37 | X1 | 1.0 | 140 | 4 | 4 | 4 | 2 | 4 | 3 | 4 | 2 | 4 | 3 | D |
| | 63 | Z38 | X1 | 1.0 | 140 | 4 | 4 | 4 | 2 | 4 | 2 | 4 | 2 | 4 | 2 | D |
| | 64 | Z39 | X1 | 1.0 | 140 | 4 | 2 | 4 | 3 | 4 | 3 | 4 | 2 | 4 | 3 | D |
| | 65 | Z40 | X1 | 1.0 | 140 | 4 | 1 | 3 | 2 | 4 | 2 | 3 | 2 | 3 | 2 | D |
| | 66 | Z41 | X1 | 1.0 | 140 | 4 | 2 | 4 | 3 | 4 | 3 | 4 | 2 | 4 | 3 | D |
| | 67 | Z42 | X1 | 1.0 | 140 | 4 | 4 | 2 | 2 | 3 | 3 | 2 | 3 | 2 | 3 | D |
| | 68 | Z43 | X1 | 1.0 | 140 | 4 | 4 | 4 | 2 | 4 | 3 | 4 | 2 | 4 | 3 | D |
| | 69 | Z44 | X1 | 1.0 | 140 | 4 | 4 | 2 | 3 | 3 | 3 | 2 | 3 | 3 | 3 | D |

*Judgment: A: very excellent, B: excellent, C: usable, D: unusable, AB: intermediate between A and B, and BC: intermediate between B and C.

It is revealed that by the surface-treated metal materials and process for producing s of Nos. 58 to 69 as Comparative Examples of the present invention, a coating film endowed with sufficient scratch resistance and particularly excellent in the press formability and corrosion resistance after the shape processing thereof is not obtained.

It is revealed that by using the surface-treated metal materials of Nos. 1 to 57 as Examples of the present invention and the process for producing s thereof, a coating which does not contain an environmental load substance such as hexavalent chromium and particularly excellent in scratch resistance, press formability and corrosion resistance after the shape processing thereof is obtained. However, in case of Coating Material Z13 used for the production of No. 13, the coating material was gelled after 2 weeks storage at a temperature of 40° C. and was inferior in the storage stability to other Coating Materials Z1 to Z12 and Z14 to Z32.

In the foregoing pages, the present invention has been described with reference to the best mode for carrying out the invention, but the present invention is of course not limited to these examples. It will be apparent to one skilled in the art that various changes and modifications can be envisaged within the scope of the claims, and these changes and modifications are duly understood to belong to the technical range of the present invention.

INDUSTRIAL APPLICABILITY

The surface-treated metal material and the process for producing the same according to the present invention can be suitably used for applications such as household electric appliances, automobiles and building materials.

The invention claimed is:

1. A surface-treated metal material, comprising:
a metal material, and a coating film disposed on the surface thereof,
the coating film containing (A) an organic resin having a glass transition temperature of more than 35° C. and not more than 100° C., and (B) an organic resin having a glass transition temperature of more than 100° C. and not more than 250° C.,
wherein the difference between the glass transition temperatures of the organic resins (A) and (B) is 50° C. or more, and
wherein the coating film has a tensile strength at 20° C. of 15 N/mm$^2$ or more, and
wherein the coating film further contains (C) silica, (E) a phosphoric acid compound and (F) a lubricity imparting agent, and
wherein the coating film further contains a crosslinked structure formed between (D) at least one crosslinking agent selected from a silane coupling agent, a carbodiimide compound, an epoxy compound, an organic titanate compound and a melamine resin, and at least one member selected from the organic resin (A), the organic resin (B) and the silica (C).

2. The surface-treated metal material according to claim 1, wherein the glass transition temperature of the organic resin (A) is more than 50° C. and not more than 100° C.

3. The surface-treated metal material according to claim 1, wherein the glass transition temperature of the organic resin (B) is more than 150° C. to not more than 250° C.

4. The surface-treated metal material according to claim 1, wherein the organic resins (A) and (B) contain an anionic functional group.

5. The surface-treated metal material according to claim 1, wherein the organic resin (A) is a polyolefin resin or a polyurethane resin.

6. The surface-treated metal material according to claim 1, wherein the organic resin (B) is a polyurethane resin.

7. The surface-treated metal material according to claim 1, wherein a mixed resin of the organic resins (A) and (B) has a tensile strength at 20° C. of 20 N/mm$^2$ or more and a total elongation at 20° C. of 20% or more.

8. The surface-treated metal material according to claim 1, wherein the coating film contains a siloxane bond or a chemical bond formed between a silanol group and another functional group.

9. A process for producing a surface-treated metal material, comprising coating a surface of a metal material with an aqueous coating material containing (A') an aqueous organic resin having a glass transition temperature of more than 35° C. to not more than 100° C. and (B') an aqueous organic resin having a glass transition temperature of more than 100° C. to not more than 250° C., so that the difference between the glass transition temperatures of the aqueous organic resins (A') and (B') being 50° C. or more, and then drying the coating by heating to thereby form a coating film, and
wherein the coating film has a tensile strength at 20° C. of 15 N/mm$^2$ or more, and
wherein the coating film further contains (C) silica, (E) a phosphoric acid compound and (F) a lubricity imparting agent, and
wherein the coating film further contains a crosslinked structure formed between (D) at least one crosslinking agent selected from a silane coupling agent, a carbodiimide compound, an epoxy compound, an organic titanate compound and a melamine resin, and at least one member selected from the organic resin (A'), the organic resin (B') and the silica (C).

10. The process for producing a surface-treated metal material according to claim 9, wherein the glass transition temperature of the aqueous organic resin (A') is more than 50° C. to not more than 100° C.

11. The process for producing a surface-treated metal material according to claim 9, wherein the glass transition temperature of the aqueous organic resin (B') is more than 150° C. to not more than 250° C.

12. The process for producing a surface-treated metal material according to claim 9, wherein the aqueous organic resins (A') and (B') contain an anionic functional group.

13. The process for producing a surface-treated metal material according to claim 12, wherein the anionic functional group is neutralized with an amine compound and the boiling point of the amine compound is not more than the maximum temperature of the metal material at the drying under heating to thereby form the coating film.

14. The process for producing a surface-treated metal material according to claim 9, wherein the aqueous organic resin (A') is a polyolefin resin or a polyurethane resin.

15. The process for producing a surface-treated metal material according to claim 9, wherein the aqueous organic resin (B') is a polyurethane resin.

16. The process for producing a surface-treated metal material according to claim 9, wherein the dry thickness of the coating film is from 0.1 to 5 μm.

17. The process for producing a surface-treated metal material according to claim 9, wherein the maximum temperature of the metal material at the drying under heating to thereby form the coating film satisfies the condition of from Tg_A (° C.) to Tg_B (° C.), wherein Tg_A (° C.) and Tg_B (° C.) represent the glass transition temperatures of the aqueous organic resins (A) and (B), respectively.

18. A surface-treated metal material comprising a metal material having on the surface thereof a coating film formed by the process for producing according to claim 9.

* * * * *